(12) United States Patent
Park

(10) Patent No.: US 10,997,094 B2
(45) Date of Patent: May 4, 2021

(54) APPARATUS AND METHOD FOR IMPROVING INPUT/OUTPUT THROUGHPUT OF A MEMORY SYSTEM

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/721,338

(22) Filed: Dec. 19, 2019

(65) Prior Publication Data

US 2020/0409875 A1   Dec. 31, 2020

(30) Foreign Application Priority Data

Jun. 26, 2019  (KR) .......................... 10-2019-0076125

(51) Int. Cl.
*G06F 13/16* (2006.01)
(52) U.S. Cl.
CPC ...... *G06F 13/1647* (2013.01); *G06F 13/1668* (2013.01)

(58) Field of Classification Search
CPC ..................... G06F 13/1647; G06F 13/1668
See application file for complete search history.

(56) References Cited

U.S. PATENT DOCUMENTS

| 9,229,854 B1 | 1/2016 | Kuzmin et al. | |
|---|---|---|---|
| 9,432,298 B1 | 8/2016 | Smith | |
| 2013/0262745 A1 | 10/2013 | Lin et al. | |
| 2017/0357447 A1* | 12/2017 | Jung | G06F 3/0659 |
| 2018/0217754 A1* | 8/2018 | Lee | G06F 3/0659 |
| 2019/0303007 A1* | 10/2019 | Hong | G06F 3/0673 |

\* cited by examiner

*Primary Examiner* — Glenn A. Auve
(74) *Attorney, Agent, or Firm* — IP & T Group LLP

(57) ABSTRACT

A memory system includes a plurality of memory dies and a controller coupled with the plurality of memory dies via a plurality of channels. The controller is configured to perform a correlation operation on at least some read requests among a plurality of read requests inputted from an external device so that the plurality of memory dies outputs plural pieces of data corresponding to the plurality of read requests via the plurality of channels in an interleaving way. The controller is configured to determine when to perform the correlation operation based on the number of the plurality of read requests.

20 Claims, 17 Drawing Sheets

| INPUT SEQUENCE OF REQUESTS | LBA | Die# | |
|---|---|---|---|
| RD1 | LA128 | Die#2 | CH#1 |
| RD2 | LA005 | Die#3 | CH#2 |
| RD3 | LA250 | Die#3 | CH#2 |
| RD4 | LA001 | Die#1 | CH#1 |
| RD5 | LA002 | Die#2 | CH#1 |
| ⋮ | ⋮ | ⋮ | |
| RD10 | LA890 | Die#4 | CH#2 |

NOT Try to Correlate

| RD1 | LA128 |
|---|---|

Correlated

| RD2 | LA005 |
|---|---|
| RD4 | LA001 |

Correlated

| RD3 | LA250 |
|---|---|
| RD5 | LA002 |

Address Allocation Scheme

| LBA | DIE# |
|---|---|
| LBA0000 | #4 |
| LBA0001 | #1 |
| LBA0002 | #2 |
| LBA0003 | #3 |
| LBA0004 | #4 |
| LBA0005 | #1 |
| ⋮ | ⋮ |

Correlation Policy $$\frac{LBA\#}{4}$$

| Remainder | Correlated With |
|---|---|
| 0 | 1 or 2 |
| 1 | 0 or 3 |
| 2 | 0 or 3 |
| 3 | 1 or 2 |

APPARATUS AND METHOD FOR IMPROVING INPUT/OUTPUT THROUGHPUT OF A MEMORY SYSTEM

CROSS-REFERENCE TO RELATED APPLICATION

This patent application claims priority under 35 U.S.C. § 119(a) to Korean Patent Application No. 10-2019-0076125, filed on Jun. 26, 2019, the entire disclosure of which is incorporated herein by reference.

TECHNICAL FIELD

Various embodiments of the invention relate to a memory system, and more particularly, to a method and an apparatus for improving data input/output performance through an interleaving operation on memory dies in the memory system.

BACKGROUND

Recently, a computer environment paradigm has shifted to ubiquitous computing, which enables a computer system to be accessed anytime and everywhere. As a result, the use of portable electronic devices such as mobile phones, digital cameras, notebook computers and the like increases. Such portable electronic devices typically use or include a memory system that uses or embeds at least one memory device, i.e., a data storage device. The data storage device can be used as a main storage device or an auxiliary storage device of a portable electronic device.

In a computing device, unlike a hard disk, a data storage device used as a nonvolatile semiconductor memory device is advantageous in that it has excellent stability and durability because it has no mechanical driving part (e.g., a mechanical arm), and has high data access speed and low power consumption. Examples of such a data storage device include a universal serial bus (USB) memory device, a memory card having various interfaces, and a solid state drive (SSD).

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
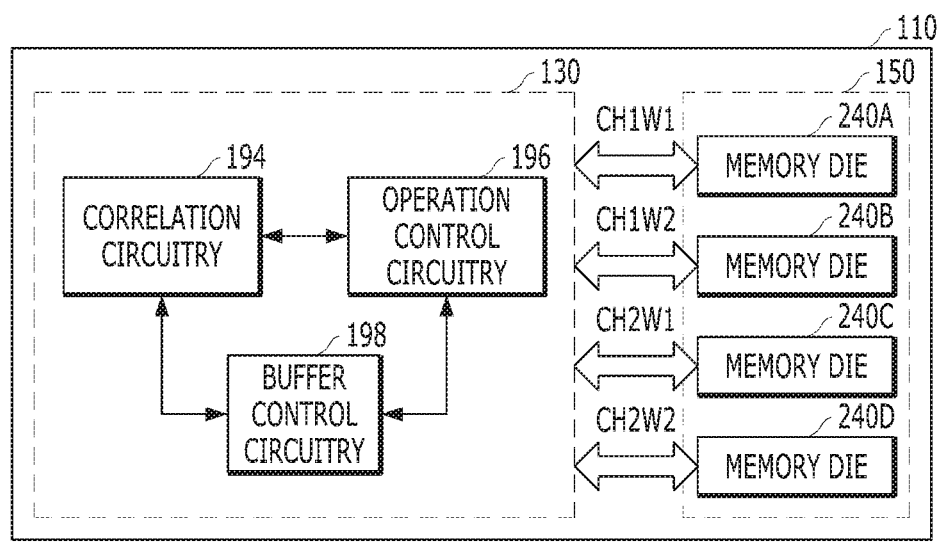
FIG. 1 illustrates a memory system according to an embodiment of the disclosure.

Various examples of the disclosure are described below in more detail with reference to the accompanying drawings. Aspects and features of the present invention, however, may be embodied in different ways to form other embodiments, including variations of any of the disclosed embodiments. Thus, the invention is not to be construed as being limited to the embodiments set forth herein. Rather, the described embodiments are provided so that this disclosure is thorough and complete and fully conveys the disclosure to those skilled in the art to which this invention pertains. Throughout the disclosure, like reference numerals refer to like parts throughout the various figures and examples of the disclosure. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could be termed a second or third element in another instance without departing from the spirit and scope of the invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention. As used herein, singular forms are intended to include the plural forms and vice versa, unless the context clearly indicates otherwise. Similarly, the indefinite articles "a" and "an" mean one or more, unless it is clear from the language or context that only one is intended.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the invention belongs in view of the disclosure. It will be further understood that terms, such as those defined in commonly used dictionaries, should be interpreted as having a meaning that is consistent with their meaning in the context of the disclosure and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

An embodiment of the disclosure may provide a memory system, a data processing system, and an operation process or a method, which may quickly and reliably process data into a memory device by reducing operational complexity and performance degradation of the memory system, thereby enhancing usage efficiency of the memory device.

In addition, an embodiment of the disclosure may provide a method and an apparatus for inputting and outputting plural pieces of data to and from a plurality of memory dies in a memory system via an interleaving way to improve data input/output performance (e.g., I/O throughput) of the memory system.

Further, an embodiment of the disclosure may provide a memory system which does not have a limitation to a physical location in which a piece of data is to be stored for an interleaving operation, in a process of storing the piece of data in a plurality of memory dies, thereby effectively utilizing the plurality of memory dies in the memory system so that an operation stability and a lifespan of a memory system may be improved.

In addition, an embodiment of the disclosure may provide an apparatus and a method for dynamically determining whether to proceed or stop a correlation operation to plural requests based on a configuration of a memory system and/or characteristics of the correlation operation, which influences an operation such as reading or writing data performed in the memory system, so that overhead in operations performed in the memory system may be reduced.

In addition, an embodiment of the disclosure may provide a memory system including an address allocation scheme which reduces resources used for the correlation operation and supports an interleaving operation to a plurality of memory dies in the memory system, thereby increasing an operational efficiency of the memory system.

In an embodiment, a memory system can include a plurality of memory dies; and a controller coupled with the plurality of memory dies via a plurality of channels and configured to perform a correlation operation on at least some read requests among a plurality of read requests inputted from an external device so that the plurality of memory dies outputs plural pieces of data corresponding to the plurality of read requests via the plurality of channels in an interleaving way. The controller can be configured to determine when to perform the correlation operation based on the number of the plurality of read requests.

The controller can be configured to perform the correlation operation when the number of pieces of data, stored in an output buffer before being outputted to the external device, is greater than a threshold.

The output buffer can include a queue capable of outputting stored data according to an input sequence of the stored data. The controller can be configured to determine the threshold based on a first data input/output speed between the external device and the memory system and a second data input/output speed between the controller and the plurality of memory dies.

The controller can be configured to skip the correlation operation when the number of the plurality of read requests is less than the number of the plurality of memory dies.

The controller can be configured to skip the correlation operation on the first read request to a (n−1)th read request among the plurality of read requests, and perform the correlation operation on an n-th read request to a last read request among the plurality of read requests. Herein, the 'n' may be the number of the plurality of channels.

The controller can be configured to haft or stop the correlation operation on remaining read requests not yet correlated when the number of the remaining read requests is less than the number of the plurality of memory dies.

The controller can be configured to allocate a physical location in the plurality of memory dies for programming each piece of data, regardless of a logical address associated with the piece of data. The controller can be configured to perform the correlation operation based on map data.

The controller can be configured to allocate a physical location in the plurality of memory dies, based on the number of the plurality of dies and a logical address associated with each piece of data. The controller can be configured to perform the correlation operation based on logical addresses corresponding to the plurality of read requests.

The memory system can further include a memory for storing map data; an input buffer for storing the plurality of read requests; and an output buffer for storing the plural pieces of data outputted to the external device.

The controller can include buffer control circuitry configured to monitor states of the input buffer and the output buffer to determine whether to perform the correlation operation; correlation circuitry configured to proceed, stop or skip the correlation operation on the plurality of read requests based on the number of the plurality of read requests received, and to transfer a correlated read request earlier than an uncorrelated read request among the plurality of read requests; and operation control circuitry configured to perform an address translation to the plurality of read requests according to a transferred sequence of the plurality of read requests, and to transfer the plurality of read requests to the plurality of memory dies via the plurality of channels.

The controller can be configured to store a correlation rate of the correlation operation, and to determine at least one threshold used as a reference for determining whether to proceed, stop or skip the correlation based on the correlation rate, the number of the plurality of channels and the number of the plurality of memory dies.

In another embodiment, a method for operating a memory system can include receiving a plurality of read requests inputted from an external device; determining when to perform a correlation operation on the plurality of read requests based on the number of the plurality of read requests received; performing the correlation operation on some read requests among the plurality of read requests based on a determination result; performing an address translation for a correlated read request to transfer the correlated read request to a plurality of memory dies via a plurality of channels; receiving data corresponding to the correlated read request from the plurality of memory dies via the plurality of channels in an interleaving way; and outputting the data to the external device.

The method can further include performing the address translation for an uncorrelated read request to transfer the uncorrelated read request to a plurality of memory dies via a plurality of channels; and receiving other data corresponding to the uncorrelated read request from the plurality of memory dies to output the other data to the external device.

The determining when to perform the correlation operation can include determining when the number of pieces of data, stored in an output buffer before outputted to the external device, is greater than a threshold. The threshold can be determined based on a first data input/output speed between the external device and the memory system and a second data input/output speed between the controller and the plurality of memory dies.

The performing the correlation operation can include skipping the correlation operation when the number of the plurality of read requests received is less than the number of the plurality of memory dies.

The performing the correlation operation can include skipping the correlation operation on the first read request to a (n−1)th read request among the plurality of read requests; and performing the correlation operation on n-th read request to the last read request among the plurality of read requests. Herein, the 'n' is the number of the plurality of channels.

The performing the correlation operation can further include halting or stopping the correlation operation on remaining read requests not yet correlated when the number of the remaining read requests is less than the number of the plurality of memory dies.

The method can further include allocating a physical location in the plurality of memory dies for programming each piece of data, regardless of a logical address associated with the piece of data. The correlation operation can be performed based on map data.

The method can further include allocating a physical location in the plurality of memory dies, based on the number of the plurality of dies and a logical address associated with each piece of data. The correlation operation can be performed based on logical addresses corresponding to the plurality of read requests.

The performing the correlation operation can include proceeding, stopping or skipping the correlation operation to the plurality of read requests based on the number of the plurality of read requests; transferring a correlated read request earlier than an uncorrelated read request among the plurality of read requests; and storing a correlation rate of the correlation operation to determine at least one threshold used as a reference for determining whether to proceed, stop or skip the correlation based on the correlation rate, the number of the plurality of channels and the number of the plurality of memory dies.

In another embodiment, a memory system can include a plurality of memory dies, and a controller coupled with the plurality of memory dies via the plurality of channels. The controller can be configured to receive a plurality of read requests from a host, correlate at least one pair of read requests, which are selected from among the plurality of read requests. Two memory dies corresponding to the pair read requests may be coupled to the controller via different channels. The controller can be further configured to transmit the pair of read requests to the corresponding two memory dies; and provide, to the host, data corresponding to the pair of read requests from the corresponding two memory dies. The correlating may be performed based on a correlating rate, the number of the plurality of channels, the number of the plurality of memory dies and the number of the plurality of read requests received.

Embodiments of the disclosure are described in detail below with reference to the accompanying drawings, wherein like numbers reference like elements.

FIG. 1 illustrates a memory system 110 according to another embodiment of the disclosure. For example, in a computing device or a mobile device embedded with the memory system 110, a host (e.g., host 102 of FIG. 2) may be engaged with the memory system 110 for data input/output (I/O) operation. The host is a kind of external device operatively engaged with the memory system 110.

Referring to FIG. 1, the memory system 110 may include a controller 130 and a memory device 150. The controller 130 may output data, which is requested by the host 102 and delivered from the memory device 150, or store data inputted from the host 102 in the memory device 150. The memory device 150 may include a plurality of non-volatile memory cells, each capable of storing data. Here, an internal structure and/or configuration of the memory device 150 may vary depending on the applicable specification or desired performance of the memory device 150, which, in turn, may be based on the purpose(s) for which the memory system 110 is used or the requirement(s) of the host 102.

The controller 130 and the memory device 150 may be coupled through a plurality of data paths. For example, the memory device 150 may include a plurality of memory dies 240A, 240B, 240C, 240D, which may be coupled with the controller 130 through different data paths. The first memory die 240A and the controller 130 are coupled through a first channel (CH1) and a first way (W1) CH1W1, and the second memory die 240B and the controller 130 are coupled through the first channel (CH1) and a second way (W2) CH1W2. The first memory die 240A and the second memory die 240B may share the first channel CH1, but the first memory die 240A and the second memory die 240B may use different ways W1, W2 independently. In addition, the third memory die 240C and the controller 130 are coupled through the second channel (CH2) and the first way (W1) CH2W1, and the fourth memory die 240D and the controller 130 are coupled via the second channel (CH2) and the second way (W2) CH2W2. The number of channels and/or ways constituting the data paths between the controller 130 and the memory device 150 may vary depending on the number of memory dies in the memory device 150. The number of channels and ways connecting the memory dies 240A, 240B, 240C, 240D to the controller 130 may be different, according to the purpose(s) of the memory system 110 or requirement(s) of the host 102.

The plurality of memory dies 240A, 240B, 240C, 240D in the memory device 150 may be configured as different modules and independently coupled with the controller 130 via different data paths. When multiple data paths are used for data exchange, the plurality of memory dies 240A, 240B, 240C, 240D and the controller 130 may use an interleaving scheme via plural data paths for exchanging data to increase speed of data transfer.

For the interleaving scheme to enhance the speed of data transfer between the memory device 150 and the controller 130, data to be stored should be distributed over several modules rather than in a single module. In executing an interleaving scheme, a memory system may use an address limitation structure or an address scheme for distributing and storing plural pieces of new data over and in a plurality of modules of the memory device 150. For example, when programming four pieces of data, the conventional memory system stores the four pieces of data in four memory dies individually. Here, the number of pieces of data may refer to the number of data units which may be stored together by a single program operation or a single write operation can be performed. For example, when a program operation (or a write operation) with a unit of page may be performed, four pieces of data may include an amount of data programmed in four pages.

In order to increase operational efficiency of program and read operations and enhance distributed storage, a memory system may employ an address limitation structure. In the address limitation structure, when four pieces of data are programmed in four memory dies, the same physical location in each memory die is allocated. For example, when storing the four pieces of data in the four memory dies, each of the four pieces of data is individually stored in the fifth physical location of a respective one of the four memory dies. Thereafter, when eight pieces of data are programmed, the eight pieces of data may be stored in the sixth and seventh physical locations of each memory die. Here, the physical location may indicate a block or a page in a memory die.

When storing five pieces of data in four memory dies in a memory system with the address limitation structure, two pieces of data may be stored in first and second physical locations of the same memory die, and three pieces of data may be individually stored in a first physical location of the other three memory dies respectively. In the memory system with the address limitation structure, three pieces of dummy data are individually written in a second physical location of the remaining three memory dies because a piece of data inputted along with the next program request cannot be written subsequently in the second physical location of the other three memory dies.

When a memory system has an address limitation structure for an interleaving operation, an operational efficiency may be degraded because pieces of dummy data may need to be programmed whenever a program operation with odd pieces of data is performed. In addition, because each memory die does not always have the same operation state (in terms of health, wear, etc.), the memory system might have to independently perform an additional operation to compensate for each memory die condition, which may increase overhead.

The memory system 110 according to an embodiment of the disclosure may adopt a full sync interleaving structure which is capable of supporting interleaving operations between the controller 130 and the memory device 150 without an address limitation structure. The full sync interleaving structure does not have an address limitation for storing data at the same location in each of a plurality of memory dies 240A, 240B, 240C, 240D in the memory device 150. The controller 130 may distribute pieces of data to be programmed according to an operation condition and an operation state of each memory die. In doing so, the pieces of data need not be evenly distributed to each memory die. For example, if one of the four memory dies 240A, 240B, 240C, 240D (say memory die 240A) cannot program a piece of data immediately due to an internal operation being performed within, the controller 130 may transfer plural pieces of data into three other memory dies (e.g., 240B, 240C, 240D). The controller 130 may distribute plural pieces of data over the plurality of memory dies 240A, 240B, 240C, 240D to increase efficiency of data transmission and reduce an operation margin of a program operation, but a strict rule such as the address limitation structure does not apply. In addition, in the memory system 110 according to an embodiment, it is unnecessary to program dummy data, as is the case in a memory system with the address limitation structure.

After the controller 130 transfers a piece of data into the memory device 150 and the piece of data is programmed in the memory device 150, the controller 130 may generate or update map information associating a logical address with a physical location (i.e., a physical address) corresponding to the data. In addition, the controller 130 may store generated or updated map information in the memory device 150.

Because the memory system 110 does not adopt the address limitation structure as described above, it might be hard to guarantee that data transmission between the controller 130 and the memory device 150 in a process of reading and outputting plural pieces of data requested by a host (or an external device) performed in an interleaving way (i.e., by an interleaving scheme). Accordingly, the controller 130 may include correlation circuitry 194 for correlating a plurality of read operations requested by the host so that plural pieces of data outputted from the memory device 150 by the plurality of read operations may be transmitted in the interleaving way.

In FIG. 1, the controller 130 may include the correlation circuitry 194, operation control circuitry 196 and buffer control circuitry 198. As used in the disclosure, the term 'circuitry' can refer to any and all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to a particular claim element, an integrated circuit for a storage device.

The buffer control circuitry 198 may control an input buffer and an output buffer. The input buffer is configured to temporarily store a command or a piece of data which is inputted from the host. The output buffer is configured to temporarily store a piece of data corresponding to a command inputted from the host before the piece of data is transmitted to the host. For example, when the host sends read requests (or read commands) for reading plural pieces of data corresponding to 20 logical addresses to the memory system 110, the controller 130 receives the plural pieces of data corresponding to the 20 logical addresses from the memory device 150, temporarily stores the plural pieces of data in the output buffer, and outputs the plural pieces of data to the host. The buffer control circuitry 198 may monitor or recognize how many pieces of data are temporarily stored in the output buffer before outputted to the host.

The operation control circuitry 196 may check a physical location in the memory device 150, which corresponds to a logical address, and read a piece of data stored in the physical location. In response to a read request (or a read command) along with a logical address from an input buffer, the operation control circuitry 196 may translate the logical address into a physical address based on the map information, and request a piece of data, stored in nonvolatile memory cells indicated by the physical address, to the memory device 150. The physical address may indicate a specific physical location in the plurality of memory dies 240A, 240B, 240C, 240D in the memory device 150. When the operation control circuitry 196 handles plural read requests according to an order or a sequence of the plural read request delivered by the buffer control circuitry 198, physical addresses corresponding to the plural read requests may be randomly distributed over the plurality of memory dies 240A, 240B, 240C, 240D. For example, three consecutive physical addresses may indicate different locations in the same memory die, or four consecutive physical addresses may indicate different locations in different memory dies. In this situation, the data transmission between the controller 130 and the plurality of memory dies 240A, 240B, 240C, 240D may be sometimes performed in the interleaving way, but it is often to exchange data between the controller 130 and the plurality of memory dies 240A, 240B, 240C, 240D randomly, not in the interleaving way.

When the buffer control circuitry 198 determines that there are pieces of data to be outputted to the host in the output buffer, plural read requests (or plural read commands) and plural logical addresses from the host may be transmitted to the correlation circuitry 194. The correlation circuitry 194 may check map information regarding the plural logical addresses corresponding to the plural read requests from the buffer control circuitry 198 to correlate the plural read requests, so that the operation control circuitry 196 may perform plural read operations corresponding to the plural read requests in the interleaving way, i.e., according to the interleaving scheme, e.g., plural pieces of data are transferred in the interleaving way between the controller 130 and the plurality of memory dies 240A, 240B, 240C, 240D. Herein, a correlation operation performed by the correlation circuitry 194 may support parallel processing and distributed computing between the controller 130 and the plurality of memory dies 240A, 240B, 240C, 240D. In a circumstance where a single data path is shared by plural components, the plural components may interleave their signals or their data in the single data path. Further, in a circumstance where plural data paths are used by a single component, the single component may distribute plural signals or plural data over the plural data paths. The correlation operation may enable some of a plurality of read requests to be delivered into the plurality of memory dies in parallel through the plurality of channels, so that plural pieces of data corresponding to the plurality of read requests are outputted in parallel from the plurality of memory dies via the plurality of channels. The correlation operation for a plurality of read requests may include that plural pieces of data requested to the memory dies 240A, 240B, 240C, 240D may be transferred from the memory device 150 to the controller 130 in the interleaving way.

It is assumed that a host requests 20 pieces of data stored in the memory system 110. The controller 130 may receive 20 read requests for the 20 pieces of data, which are inputted from the host. The buffer control circuitry 198 may transmit the 20 read requests for the 20 pieces of data to the correlation circuitry 194. The correlation circuitry 194 tries to correlate the 20 read requests so that at least some among the 20 pieces of data are outputted in the interleaving way. For example, the correlation circuitry 194 may check a physical address corresponding to a first logical address inputted along with a first read request among the 20 read requests, and then recognize that first data corresponding to the first logical address is stored in the first memory die 240A. The correlation circuitry 194 may check a physical address corresponding to a second logical address inputted along with a second read request among the 20 read requests. When second data corresponding to the second read request is stored in the third memory die 240C or the fourth memory die 240D, an interleaving operation between the first and second read requests may be expected because the first data and the second data respectively corresponding to the first and second read requests may be transmitted via different channels CH1, CH2. Thus, the first and second read requests may be paired or correlated by the correlation circuitry 194, and paired or correlated read requests may be transmitted to the operation control circuitry 196.

However, if the second data is stored in the first memory die 240A or the second memory die 240B, the interleaving operation between the first and second read requests may not be expected because the first data and the second data respectively corresponding to the first and second read requests may be transmitted via the same channels CH1. In this case, the correlation circuitry 194 may not pair or correlate the first and second read requests. Then, the correlation circuitry 194 may check a physical address for a third read request. When third data corresponding to the third read request is stored in the third memory die 240C or the fourth memory die 240D, the interleaving operation between the first request and the third request may be expected because the first data and the third data respectively corresponding to the first and third read requests may be transmitted via different channels CH1, CH2. The correlation circuitry 194 may correlate the first read request and the third read request and transmit correlated read request to the operation control circuitry 196. The third read request may be transmitted earlier than the second read request.

However, if the third data is stored in the first memory die 240A or the second memory die 240B, the interleaving operation between the first request and the third request may not be expected because the first and third data are transmitted via the same channel. Then, the correlation circuitry 194 may check a physical address for a fourth read request.

As described above, the correlation circuitry 194 may check a physical location where data corresponding to a read request is stored, correlate some of read requests when an interleaving operation between the read requests may be expected, and transfer correlated read requests to the operation control circuitry 196. For the correlation operation, the correlation circuitry 194 may refer to map information in the controller 130 or loaded in a memory or a buffer of the controller 130.

The correlation operation with respect to a plurality of read requests, which is performed by the correlation circuitry 194, may adversely affect data input/output performance such as I/O throughput of the memory system 110 because the correlation operation may cause a delay. Accordingly, the correlation circuitry 194 may not perform the correlation operation for all read requests from the host. For example, the buffer control circuitry 198 may check pieces of data in the output buffer, which are outputted to the host, to determine whether the data input/output performance of the memory system 110 would not be degraded if the correlation circuitry 194 performs the correlation operation to the plurality of read requests. The correlation circuitry 194 may perform the correlation operation regarding the plurality of read requests in a situation where it is determined that the correlation operation has no or little influence on the I/O throughput.

In addition, the correlation circuitry 194 may not correlate all of the plurality of read requests from the buffer control circuitry 198. When the interleaving operation may be expected considering the physical locations of the pieces of data corresponding to the plurality of read requests, the correlation circuitry 194 may perform the correlation operation. But, other read requests, received after these read requests are correlated by the correlation circuitry 194 may be transferred uncorrelated to the operation control circuitry 196.

In response to an operation environment, the controller 130 may correlate at least some of the plurality of read requests from the host, so that plural pieces of data are transferred in the interleaving way between the memory device 150 and the controller 130. In addition, the memory system 110 does not have to adopt an address limitation structure for exchanging signals or data in the interleaving way within the memory system 110. Plural pieces of data may be distributed and stored based on operation environment and operation states of the plurality of memory dies 240A, 240B, 240C, 240D in the memory device 150. The controller 130 may attempt to correlate read requests for reading plural pieces of data stored in the plurality of memory dies 240A, 240B, 240C, 240D in the memory device 150. Because the memory system 110 does not have to use the address limitation structure, the plurality of memory dies 240A, 240B, 240C, 240D in the memory device 150 may be operated more efficiently, and lifespans of the plurality of memory dies 240A, 240B, 240C, 240D in the memory device 150 may be improved. On the other hand, since data transfer between the plurality of memory dies 240A, 240B, 240C, 240D and the controller 130 may be performed in the interleaving way, the memory system 110 according to an embodiment of the disclosure can avoid deteriorating the data input/output performance (e.g., I/O throughput) thereof.

Figure 2:
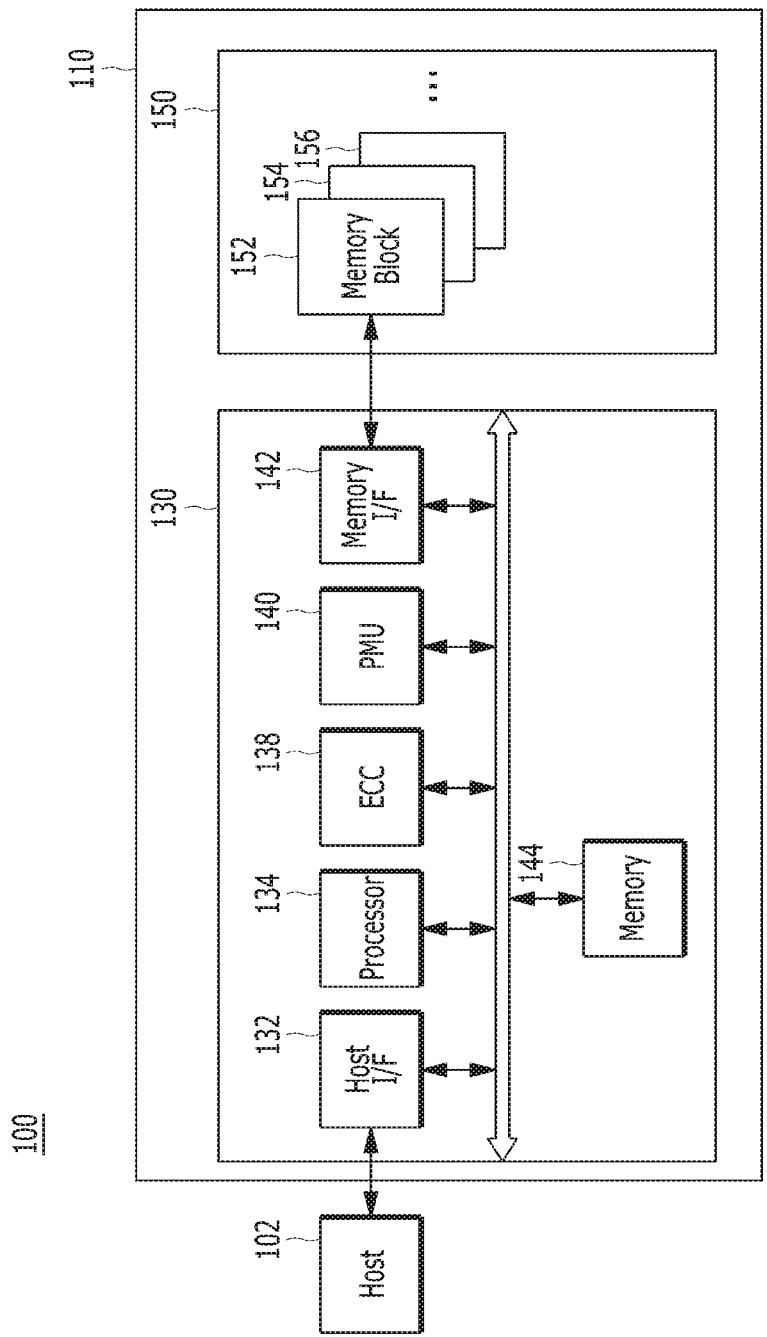
FIG. 2 illustrates a data processing system including a memory system according to an embodiment of the disclosure.

FIG. 2 illustrates a data processing system including a memory system according to an embodiment of the disclosure. Referring to FIG. 2, the data processing system 100 may include a host 102 engaged or operably coupled with a memory system 110.

The host 102 may include, for example, any of a variety of portable electronic devices, such as a mobile phone, an MP3 player and a laptop computer, or an electronic device such as a desktop computer, a game player, a television (TV), a projector and the like.

The host 102 also includes at least one operating system (OS), which can generally manage, and control, functions and operations performed in the host 102. The OS may provide interoperability between the host 102 engaged with the memory system 110 and the user of the memory system 110. The OS may support functions and operations corresponding to user's requests. By way of example but not limitation, the OS may include a general operating system and a mobile operating system according to mobility of the host 102. The general operating system may be split into a personal operating system and an enterprise operating system according to system requirements or user's environment. The personal operating system, including Windows and Chrome, may be subject to support services for general purposes. The enterprise operating systems may be specialized for securing and supporting high performance, including Windows servers, Linux and Unix. Further, the mobile operating system may include an Android, an iOS and a Windows mobile. The mobile operating system may be subject to support services or functions for mobility (e.g., a power saving function). The host 102 may include a plurality of operating systems. The host 102 may execute multiple operating systems in cooperation with the memory system 110, corresponding to a user's request. The host 102 may transmit a plurality of commands corresponding to the user's requests into the memory system 110, thereby performing operations corresponding to commands within the memory system 110. Handling plural commands in the memory system 110 is described below with reference to FIGS. 4 and 5.

The memory system 110 may perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card and a memory stick.

The storage devices for the memory system 110 may be implemented with a volatile memory device, for example, a dynamic random access memory (DRAM) or a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) or a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems as exemplified above.

By way of example but not limitation, the controller 130 and the memory device 150 may be integrated into a single semiconductor device. The controller 130 and memory device 150 may be so integrated to form an SSD for improving operation speed. When the memory system 110 is used as an SSD, the operating speed of the host 102 connected to the memory system 110 can be improved more than that of the host 102 connected with a hard disk. In another embodiment, the controller 130 and the memory device 150 may be integrated into one semiconductor device to form a memory card, such as a PC card (PCMCIA), a compact flash card (CF), a smart media card (e.g., SM, SMC), a memory stick, a multimedia card (e.g., MMC, RS-MMC, MMCmicro), a secure digital (SD) card (e.g., SD, miniSD, microSD, SDHC), or a universal flash memory.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while electrical power is not supplied. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes memory blocks, among the plurality of memory blocks 152, 154, 156. In addition, the memory device 150 may be a non-volatile memory device, for example a flash memory, wherein the flash memory may be a three-dimensional stack structure.

The controller 130 may control overall operations of the memory device 150, such as read, write, program and erase operations. For example, the controller 130 may control the memory device 150 in response to a request from the host 102. The controller 130 may provide the data, read from the memory device 150, with the host 102. The controller 130 may store the data, provided by the host 102, into the memory device 150.

The controller 130 may include a host interface (I/F) 132, a processor 134, an error correction code (ECC) circuitry 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols, such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE). In accordance with an embodiment, the host interface 132 is a component for exchanging data with the host 102, which may be implemented through firmware caned a host interface layer (HIL).

The ECC circuitry 138 may correct error bits of the data to be processed in (e.g., outputted from) the memory device 150, which may include an ECC encoder and an ECC decoder. Here, the ECC encoder may perform error correction encoding of data to be programmed in the memory device 150 to generate encoded data into which a parity bit is added and store the encoded data in memory device 150. The ECC decoder may detect and correct errors contained in a data read from the memory device 150 when the controller 130 reads the data stored in the memory device 150. In other words, after performing error correction decoding on the data read from the memory device 150, the ECC circuitry 138 may determine whether the error correction decoding has succeeded and output an instruction signal (e.g., a correction success signal or a correction fail signal). The ECC circuitry 138 may use the parity bit which is generated during the ECC encoding process, for correcting the error bit of the read data. When the number of the error bits is greater than or equal to a threshold number of correctable error bits, the ECC circuitry 138 may not correct error bits but instead may output an error correction fail signal indicating failure in correcting the error bits.

The ECC circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), or a Block coded modulation (BCM). The ECC circuitry 138 may include any and all circuits, modules, systems or devices for performing the error correction operation based on at least one of the above described codes.

The PMU 140 may manage an electrical power provided in the controller 130. For example, the PMU 140 may detect the power-on 312 and the power-off 314 described in FIG. 1. In addition, the PMU 140 may include a power detector.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 may provide an interface for handling commands and data between the controller 130 and the memory device 150, for example, operations of NAND flash interface, in particular, operations between the controller 130 and the memory device 150. In accordance with an embodiment, the memory interface 142 may be implemented through firmware called a flash interface layer (FIL) as a component for exchanging data with the memory device 150.

The memory 144 may support operations performed by the memory system 110 and the controller 130. The memory 144 may store temporary or transactional data generated or delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data required for the controller 130 and the memory device 150 to perform operations such as read operations or program/write operations.

The memory 144 may be implemented with a volatile memory. The memory 144 may be implemented with a static random access memory (SRAM), a dynamic random access memory (DRAM) or both. Although FIG. 1 exemplifies the memory 144 disposed within the controller 130, the present invention is not limited to that arrangement. That is, the memory 144 may be within or externally to the controller 130. For instance, the memory 144 may be embodied by an external volatile memory having a memory interface transferring data and/or signals between the memory 144 and the controller 130.

The memory 144 may store data for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache and a map buffer/cache.

The processor 134 may be implemented with a microprocessor or a central processing unit (CPU). The memory system 110 may include one or more processors 134. The processor 134 may control the overall operations of the memory system 110. By way of example but not limitation, the processor 134 can control a program operation or a read operation of the memory device 150, in response to a write request or a read request entered from the host 102. In accordance with an embodiment, the processor 134 may use or execute firmware to control the overall operations of the memory system 110. Herein, the firmware may be a flash translation layer (FTL). The FTL may serve as an interface between the host 102 and the memory device 150. The host 102 may transmit requests for write and read operations to the memory device 150 through the FTL.

The FTL may manage operations of address mapping, garbage collection, wear-leveling and so forth. Particularly, the FTL may load, generate, update, or store map data. Therefore, the controller 130 may map a logical address, which is entered from the host 102, with a physical address of the memory device 150 through the map data. The memory device 150 may otherwise function as a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the particular page to the newly programed page) due to a characteristic of a flash memory device. Further, the controller 130 may store map data of the new data into the FTL.

For example, when performing an operation requested from the host 102 in the memory device 150, the controller 130 uses the processor 134. The processor 134 engaged with the memory device 150 may handle instructions or commands corresponding to an inputted command from the host 102. The controller 130 may perform a foreground operation as a command operation, corresponding to an command from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation for the memory device 150 includes copying data in a memory block, among the memory blocks 152, 154, 156, and storing such data in another memory block (e.g., a garbage collection (GC) operation). The background operation may include an operation to move data stored in at least one of the memory blocks 152, 154, 156 in the memory device 150, into at least another of the memory blocks 152, 154, 156 (e.g., a wear leveling (WL) operation). During a background operation, the controller 130 may use the processor 134 for storing the map data stored in the controller 130 to at least one of the memory blocks 152, 154, 156, e.g., a map flush operation. A bad block management operation of checking for bad blocks among the plurality of memory blocks 152, 154, 156 is another example of a background operation performed by the processor 134.

In the memory system 110, the controller 130 performs a plurality of command operations corresponding to a plurality of commands received from the host 102. For example, when performing a plurality of program operations corresponding to plural program commands, a plurality of read operations corresponding to plural read commands and a plurality of erase operations corresponding to plural erase commands sequentially, randomly or alternatively, the controller 130 may determine which channel(s) or way(s) for connecting the controller 130 to which memory die(s) in the memory 150 is/are proper or appropriate for performing each operation. The controller 130 may send or transmit data or instructions via determined the channel(s) or way(s) for performing each operation. The plurality of memory dies may transmit an operation result via the same channel(s) or way(s), respectively, after each operation is complete. Then, the controller 130 may transmit a response or an acknowledge signal to the host 102. In an embodiment, the controller 130 may check a status of each channel or each way. In response to a command received from the host 102, the controller 130 may select at least one channel or way based on the status of each channel or each way so that instructions and/or operation results with data may be delivered via selected channel(s) or way(s).

By way of example but not limitation, the controller 130 may recognize statuses regarding channels (or ways) associated with memory dies in the memory device 150. The controller 130 may determine each channel or each way as being in a busy state, a ready state, an active state, an idle state, a normal state, or an abnormal state. The controller's determination of which channel or way an instruction (and/or a data) is delivered through can be based on a physical block address, e.g., to which die(s) the instruction (and/or the data) is delivered. The controller 130 may refer to descriptors delivered from the memory device 150. The descriptors may include a block or page of parameters that describe informative items about the memory device 150, which is a data with a set format or structure. For instance, the descriptors may include device descriptors, configuration descriptors, unit descriptors, and the like. The controller 130 can refer to, or use, the descriptors to determine with which channel(s) or way(s) an instruction or a data is exchanged.

A management unit (not shown) may be included in the processor 134. The management unit may perform bad block management of the memory device 150. The management unit may find bad memory blocks, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 3:
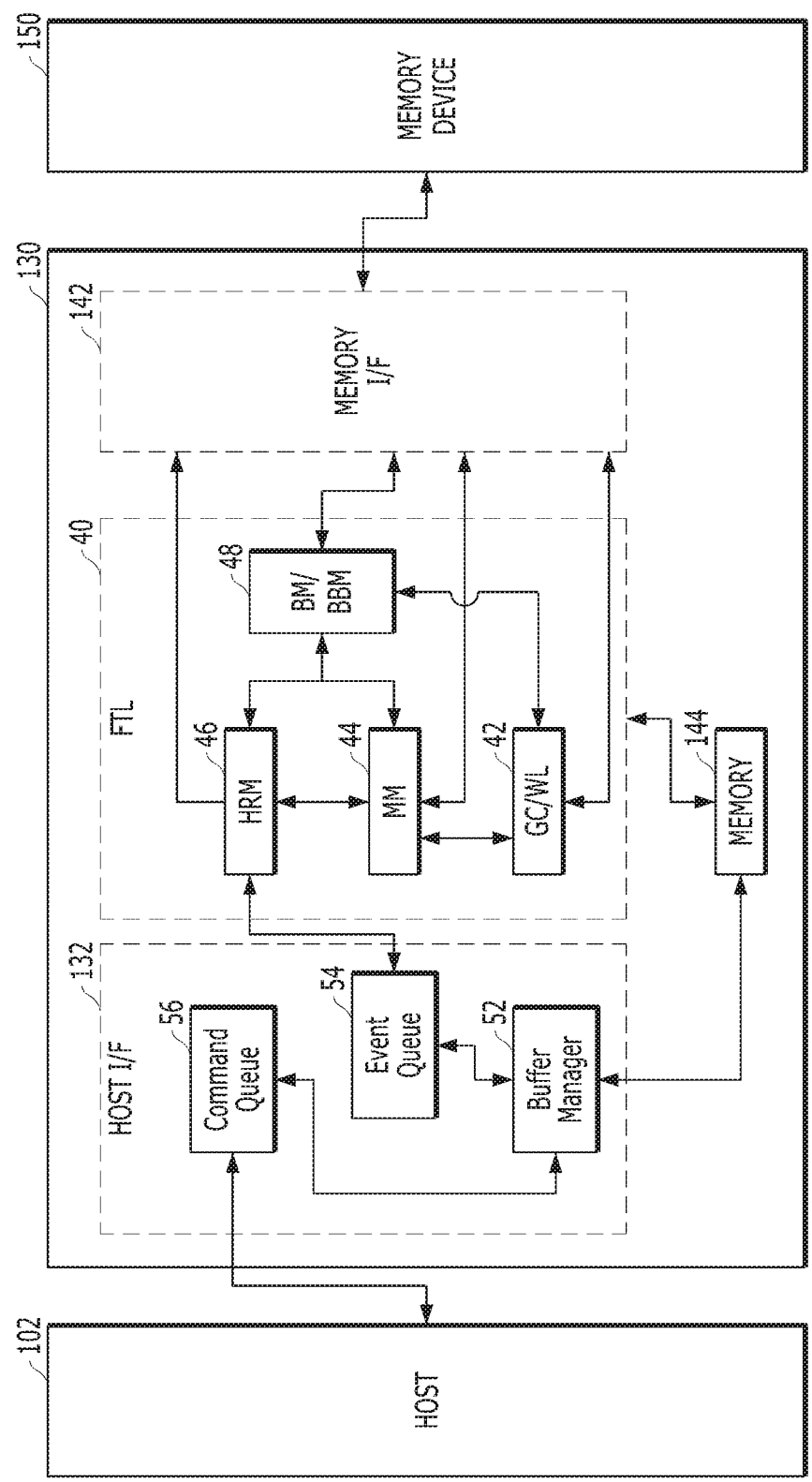
FIG. 3 illustrates a controller in a memory system according to an embodiment of the disclosure.

FIG. 3 illustrates a controller 130 in a memory system according to an embodiment of the disclosure. Referring to FIG. 3, the controller 130 cooperates with the host 102 and the memory device 150. The controller 130 may include a host interface (I/F) 132, a flash translation layer (FTL) circuitry 40, a memory interface (I/F) 142 and a memory 144.

Although not shown in FIG. 3, in accordance with an embodiment, the ECC circuitry 138 in FIG. 2 may be included in the flash translation layer (FTL) circuitry 40. In another embodiment, the ECC circuitry 138 may be implemented as a separate module, a circuit, or firmware, which is included in, or associated with, the controller 130.

The host interface 132 is for handling commands and data from the host 102. By way of example but not limitation, the host interface 132 may include a command queue 56, a buffer manager 52 and an event queue 54. The command queue 56 may sequentially store commands and data from the host 102 and output them to the buffer manager 52 in a stored order. The buffer manager 52 may classify, manage or adjust the commands and the data, which are delivered from the command queue 56. The event queue 54 may sequentially transmit events for processing the commands and the data, from the buffer manager 52.

A plurality of commands or data of the same characteristic may be continuously received from the host 102, or commands and data of different characteristics may be transmitted to the memory system 110 after being mixed or jumbled. For example, a plurality of commands for reading data (i.e., read commands) may be delivered, or read commands and program/write commands may be alternately transmitted to the memory system 110. The host interface 132 may store commands and data, which are received from the host 102, to the command queue 56 sequentially. Thereafter, the host interface 132 may estimate or predict what kind of internal operation the controller 130 will perform according to the characteristics of the command and data, which is received from the host 102. The host interface 132 may determine a processing order and a priority of commands and data, based at least on their characteristics. According to characteristics of commands and data, from the host 102, the buffer manager 52 in the host interface 132 is configured to determine whether the buffer manager 52 should store commands and data in the memory 144, or whether the buffer manager 52 should deliver the commands and the data into the flash translation layer (FTL) circuitry 40. The event queue 54 receives events, entered from the buffer manager 52, which are to be internally executed and processed by the memory system 110 or the controller 130 in response to the commands and the data from the host 102, so as to deliver the events into the flash translation layer (FTL) circuitry 40 in the order received.

In accordance with an embodiment, the host interface 132 in FIG. 3 may perform the functions of the controller 130 in FIG. 1.

In accordance with an embodiment, the flash translation layer (FTL) circuitry 40 may include a state manager (GC/WL) 42, a map manager (MM) 44, a host request manager (HRM) 46, and a block manager (BM/BBM) 48. The host request manager 46 may manage the events entered from the event queue 54. The map manager 44 may handle or control a map data. The state manager 42 may perform garbage collection (GC) or wear leveling (WL). The block manager 48 may execute commands or instructions onto a block in the memory device 150.

By way of example but not limitation, the host request manager 46 may use the map manager 44 and the block manager 48 to handle or process requests according to the read and program commands, and events which are delivered from the host interface 132. The host request manager 46 may send an inquiry request to the map data manager 44, to determine a physical address corresponding to the logical address which is entered with the events. The host request manager 46 may send a read request with the physical address to the memory interface 142, to process the read request (handle the events). On the other hand, the host request manager 46 may send a program request (or write request) to the block manager 48, to program entered data to an empty page (i.e., a page having no data) in the memory device 150, and then, may transmit a map update request corresponding to the program request to the map manager 44, to update an item relevant to the programmed data in information of mapping the logical-physical addresses to each other.

Here, the block manager 48 may convert a program request delivered from the host request manager 46, the map data manager 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests for multiple-plane and one-shot program operations to the memory interface 142. The block manager 48 may send several flash program requests to the memory interface 142 to enhance or maximize parallel processing of the multi-channel and mufti-directional flash controller.

The block manager 48 may be configured to manage blocks in the memory device 150 according to the number of valid pages, select and erase blocks having no valid pages when a free block is needed, and select a block including the least number of valid pages when it is determined that garbage collection is necessary. The state manager 42 may perform garbage collection to move the valid data to an empty block and erase remaining data in the blocks from which the valid data was moved so that the block manager 48 may have enough free blocks (i.e., empty blocks with no data). If the block manager 48 provides information regarding a block to be erased to the state manager 42, the state manager 42 is able to check all flash pages of the block to be erased to determine whether each page is valid. For example, to determine validity of each page, the state manager 42 may identify a logical address stored in an out-of-band (OOB) area of each page. To determine whether each page is valid, the state manager 42 may compare the physical address of the page with the physical address mapped to the logical address obtained from the request. The state manager 42 sends a program request to the block manager 48 for each valid page. A mapping table may be updated through the update of the map manager 44 when the program operation is complete.

The map manager 44 may manage a logical-physical mapping table. The map manager 44 may process requests such as queries and updates, which are generated by the host request manager 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request may be sent to the block manager 48 so that a clean cache block is made and the dirty map table may be stored in the memory device 150.

When garbage collection is performed, the state manager 42 copies valid page(s) into a free block, and the host request manager 46 may program the latest version of the data for the same logical address of the page and currently issue an update request. When the state manager 42 requests the map update in a state in which copying of valid page(s) has not been completed, the map manager 44 may not perform the mapping table update. This is because the map request is issued with old physical information if the state manger 42 requests a map update and a valid page copy is not completed until later. The map manager 44 may perform a map update operation to ensure accuracy only if the latest map table still points to the old physical address.

In accordance with an embodiment, the FTL circuitry 40 may include the correlation circuitry 194 shown in FIG. 1, and the memory interface 142 may include the operation control circuitry 196 and the buffer control circuitry 198 shown in FIG. 1. In another embodiment, the memory interface 142 includes the correlation circuitry 194, the operation control circuitry 196 and the buffer control circuitry 198 shown in FIG. 1.

The memory device 150 may include a plurality of memory blocks. Each of the plurality of memory blocks may be a single level cell (SLC) memory block or a multi level cell (MLC) memory block, according to the number of bits that can be stored or represented in one memory cell of such block. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have a larger storage capacity for the same space compared to the SLC memory block. The MLC memory block can be highly integrated in terms of storage capacity. In an embodiment, the memory device 150 may be implemented with MLC memory blocks, such as a double level cell memory block, a triple level cell (TLC) memory block, a quadruple level cell (QLC) memory block and a combination thereof. The double level memory block may include a plurality of pages implemented by memory cells, each capable of storing 2-bit data. The triple level cell (TLC) memory block may include a plurality of pages implemented by memory cells, each capable of storing 3-bit data. The quadruple level cell (QLC) memory block may include a plurality of pages implemented by memory cells, each capable of storing 4-bit data. In another embodiment, the memory device 150 may be implemented with a block including a plurality of pages implemented by memory cells, each capable of storing 5-bit or more bit data.

In an embodiment of the disclosure, the memory device 150 is embodied as a nonvolatile memory such as a flash memory such as a NAND flash memory, a NOR flash memory and the like. In another embodiment, the memory device 150 may be implemented by at least one of a phase change random access memory (PCRAM), a ferroelectrics random access memory (FRAM) and a spin injection magnetic memory (e.g., a spin transfer torque magnetic random access memory (STT-MRAM)).

Figure 4:
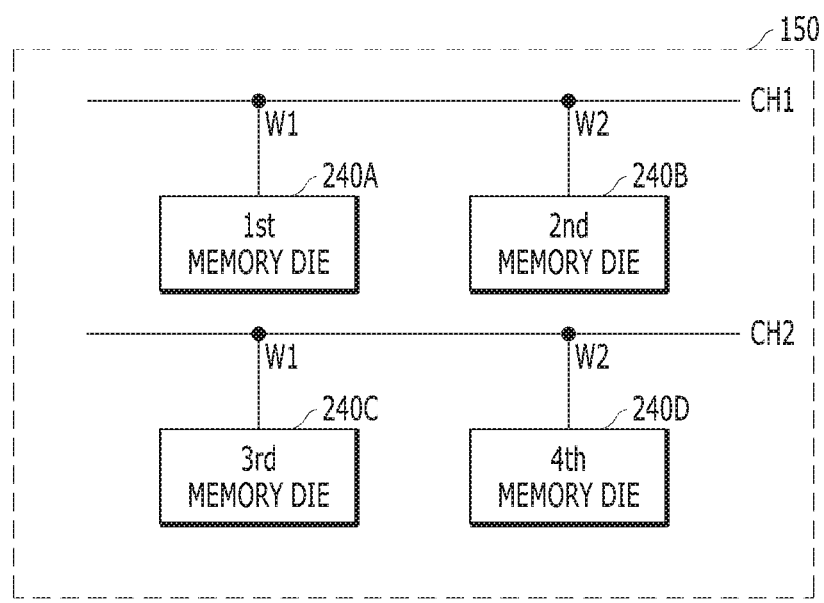
FIG. 4 illustrates a memory device in a memory system according to an embodiment of the invention.

FIG. 4 illustrates a memory device in a memory system in accordance with an embodiment of the invention. More specifically, FIG. 4 illustrates an internal configuration of the memory device 150.

Referring to FIG. 4, the memory device 150 may include the plurality of memory dies 240A, 240B, 240C, 240D. The first memory die 240A and the second memory die 240B may be connected to the controller 130 (see FIGS. 1 through 3) through the first channel CH #1. The third memory die 240C and the fourth memory die 240D may be connected to the controller 130 through the second channel CH #2.

In FIG. 4, a configuration in which four memory dies 240A, 240B, 240C, 240D are coupled to the controller 130 through two channels CH #1, CH #2 is described. However, the invention can be not limited that or any particular configuration of dies and channels. Even though the memory device 150 may include at least two dies and at least two channels, the number of dies and channels in a given configuration depends on the various factors, such as the overall configuration of the memory system, the purpose(s) for which it is employed and the specification defining communication between the memory system and the engaged host.

When a plurality of memory dies is connected to a single channel, each memory die may be coupled with the channel through different ways. In FIG. 4, the first memory die 240A and the second memory die 240B may be coupled with the first channel CH #1 through the first way W1 and the second way W2, individually. The third memory die 240C and the fourth memory die 240D may be coupled with the second channel CH #2 through the first way W1 and the second way W2, individually. In this particular configuration, the number of ways is the same as the number of memory dies.

Figure 5A:
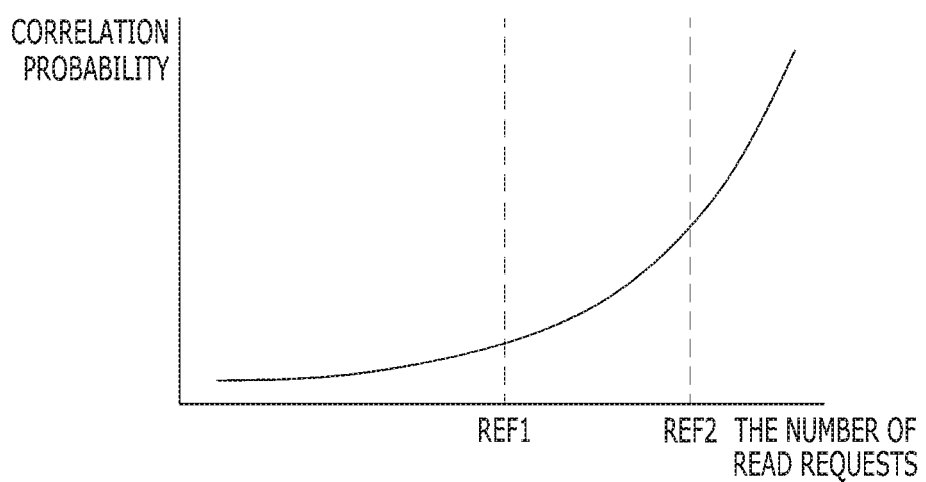
FIGS. 5A and 5B illustrate characteristics of a correlation operation performed by a controller according to an embodiment of the invention.
Figure 5B:
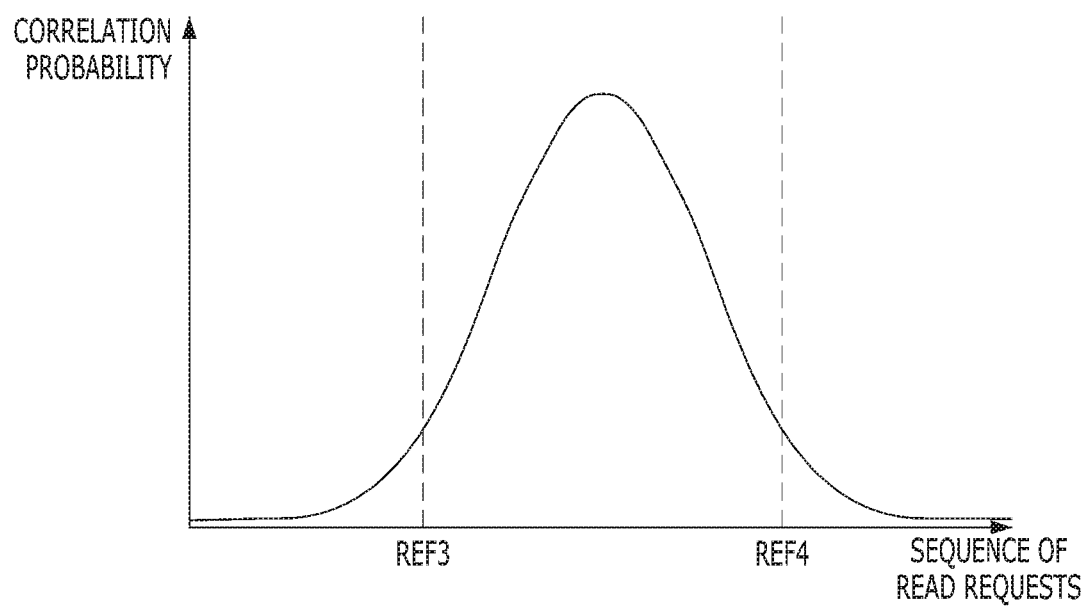

FIGS. 5A and 5B illustrate characteristics of the correlation operation performed by the controller. Specifically, the two graphs in FIGS. 5A and 5B may illustrate a result obtained by performing the correlation operation repeatedly under an unspecified and random situation.

Referring to FIG. 5A, as the correlation circuitry 194 in the controller 130 of FIG. 1 tries to perform the correlation operation to an increasing number of read requests, a probability of correlating such read requests increases as the read requests increase. For example, the probability of correlating 20 read requests is greater than that of 5 read requests.

When there is no address limitation in a memory system, physical locations in the memory device 150 corresponding to logical addresses delivered with a few read requests may not be distributed. In this case, the number of read requests correlated by the correlation circuitry 194 may be small. However, when a large number of read requests are transmitted to the memory system 110 (see FIGS. 1 to 3), the probability that the read requests are correlated is higher. For example, the probability of correlation may be higher when the number of read requests is the second reference value REF2 compared to when the number of read requests is the first reference value REF1, which is less than REF2.

Referring to FIG. 5B, when a plurality of read requests are sequentially transmitted to the correlation circuitry 194, the probability of correlation according to an input time (or input sequence) of the read requests is described. As described with reference to FIG. 4, it is assumed that there are two channels between the controller 130 and the memory device 150 in the memory system 110. For example, a first read request sent to the correlation circuitry 194 may not be correlated because there are no other read requests which are ready to be correlated. When a second read request is delivered to the correlation circuitry 194, the second read request may or may not be correlated with the first read request; the probability is 50:50. When a third read request is delivered to the correlation circuitry 194, the correlation circuitry 194 may attempt to correlate the third read request with the first and second read requests if the first and second read requests are not correlated. Thus, the probability of correlation may be higher at the time when the third read request is delivered than at the time when the second read request is delivered. Based on these characteristics, the correlation circuitry 194 may distinguish states before and after a specific read request is received. For example, after a read request (corresponding to third reference value REF3) is received, the correlation circuitry 194 may determine that a probability of correlation is sufficiently high, and attempt to perform the correlation operation on the previously-received read request(s) together with the (REF3)th read request. In contrast, before the (REF3)th read request is received, the correlation circuitry 194 may determine that a probability of correlation is too low, and thus skip performing the correlation operation on the read requests received before the REF3 read request.

In another example, it is assumed that 20 read requests are delivered. When the 19th and 20th read requests are inputted, the probability of correlation may be lower when the 9th to 11th read requests are inputted. This is because, when the 19th and 20th read requests are inputted, the previously inputted read requests, i.e., 1st to 18th read requests, may have been already correlated and outputted to the operation control circuitry 196. As the correlated read requests are transferred after a certain time passes, the probability of correlation may be lowered. After the probability of correlation become lowered, it is unlikely that the probability of correlation increases again if a new read request is not delivered. In order to avoid the correlation circuitry 194 wasting resources (for example, time, operation margin, or power) to perform the correlation operation, the correlation operation may be stopped or halted at a time when the read request corresponding to a fourth reference value REF4 is transmitted.

In an embodiment, the correlation circuitry 194 may stop the correlation operation in response to the number of uncorrelated read requests. For example, if a small number of uncorrelated read requests, e.g., two or three, remain, among the 20 read requests, the correlation circuitry 194 may output the uncorrelated read requests to the operation control circuitry 196 without holding them for a next correlation operation. When the correlation circuitry 194 holds a few read requests for performing a next correlation operation, the data input/output performance (e.g., I/O throughput) of the memory system 110 may be deteriorated.

Figure 6:
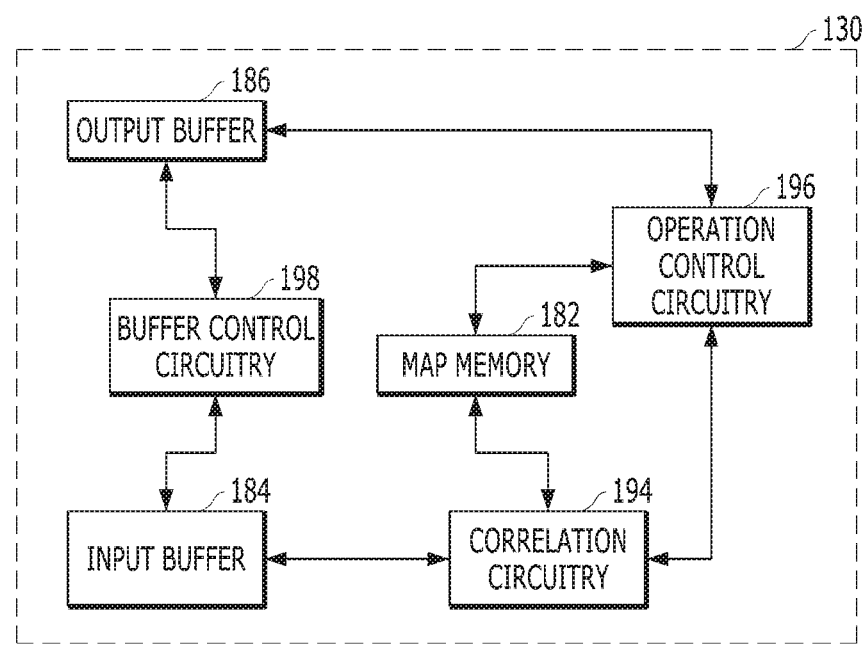
FIG. 6 illustrates a controller according to an embodiment the invention.

FIG. 6 illustrates an internal configuration of the controller 130 according to an embodiment of the invention.

Referring to FIG. 6, the controller 130 may include the correlation circuitry 194, the operation control circuitry 196 and the buffer control circuitry 198. For example, the buffer control circuitry 198, the correlation circuitry 194, and the operation control circuitry 196 may be operatively engaged with an output buffer 186, an input buffer 184 and a map memory 182 to proceed with or stop the correlation operation.

The controller 130 may include the output buffer 186, the input buffer 184, and the map memory 182. According to an embodiment, the output buffer 186, the input buffer 184, and the map memory 182 may be functional modules that may be implemented with the memory 144 described with reference to FIGS. 2 to 3. The output buffer 186, the input buffer 184, and the map memory 182 may be implemented with a single volatile memory device or plural, separate volatile memory devices. In an embodiment, the output buffer 186, the input buffer 184 and the map memory 182 may be implemented with a plurality of cache memories.

For example, each of the output buffer 186 and the input buffer 184 may have a data structure such as a queue. In this case, the output buffer 186 and the input buffer 184 may output a piece of data according to the stored order of data (e.g., first-in first-out, FIFO). The map memory 182 may have various structures according to map data, and storage structure and management rule regarding map information.

The controller 130 may translate a logical address, which is an address inputted from the host 102 (see FIGS. 2 and 3), into a physical address indicating a physical location in the memory device 150 (see FIGS. 1 to 4). The controller 130 may load the map data and the map information stored in the memory device 150 for performing address translation.

According to an embodiment, when there is a sufficient storage space in the memory 144 (see FIGS. 2 and 3) which is included in the controller 130 or operably engaged with the controller 130, all map data, or all map information, used for address translation may be loaded once. However, in a case when the memory system 110 (see FIGS. 1 to 3) is mounted in a portable terminal, it may be difficult for the controller 130 to have sufficient storage space for storing all of map data or all of map information. In this case, the controller 130 may retrieve specific map data, i.e., some of map data, from the memory device 150, use or update the retrieved map data, store updated map data in the memory device 150, and retrieve other map data stored in the memory device 150. According to an embodiment, a pre-allocated space in the memory 144 may be utilized for storing map data or map information.

If the requested map data cannot be stored in a region of the memory 144, the controller 130 may remove the least recently used (LRU) map data in the region based on an LRU replacement scheme. As another example, when the requested map data cannot be stored in the region of the memory 144, the controller 130 may remove the least frequently used (LFU) map data in the region based on an LFU replacement scheme. The controller 130 requests the map data or the map information for performing address translation from the memory device 150, which incurs overhead, so that overall performance or I/O throughput of the memory system 110 may be degraded. Thus, it is desirable to avoid unnecessary replacement of map data and map information.

For example, it is assumed that there are 20 read requests for correlation. The controller 130 may check the map memory 182 based on logical addresses associated with the 20 read requests. It is assumed that map addresses or map data relevant to 11 read requests are found in the map memory 182, and the map data or the map addresses relevant to 9 read requests are not found in the map memory 182. In this case, the controller 130 may load map data or map addresses relevant for the 9 read requests from the memory device 150 into the map memory 182. According to an embodiment, when a storage space of the map memory 182 is not sufficient, the correlation circuitry 194 may first perform the correlation operation with respect to the 11 read requests of which map addresses or map data has been loaded in the map memory 192.

The correlation operation performed by the correlation circuitry 194 may be considered overhead in a view of data input/output performance (e.g., I/O throughput) of the memory system 110 (see FIGS. 1 to 3). Accordingly, when the operation control circuitry 196 is in an idle state, it may be desirable for the correlation circuitry 194 not to perform the correlation operation to all read requests. Without the correlation operation, the correlation circuitry 194 transfers at least one read request to the operation control circuitry 196, so that the operation control circuitry 196 may transition out of the idle state to an operational state. Based on the characteristics of the correlation operation described with reference to FIG. 5, the correlation circuitry 194 may determine whether to proceed or stop the correlation operation. For example, when the number of read requests is less than the first reference value REF1, the correlation circuitry 194 may not perform the correlation operation on the read requests. In addition, a first read request transmitted to the correlation circuitry 194 may be transferred to the operation control circuitry 196 without the correlation operation. Furthermore, when the number of read requests remaining in the correlation circuitry 194 is less than a preset threshold, the correlation circuitry 194 may stop or halt the correlation operation.

Figure 7:
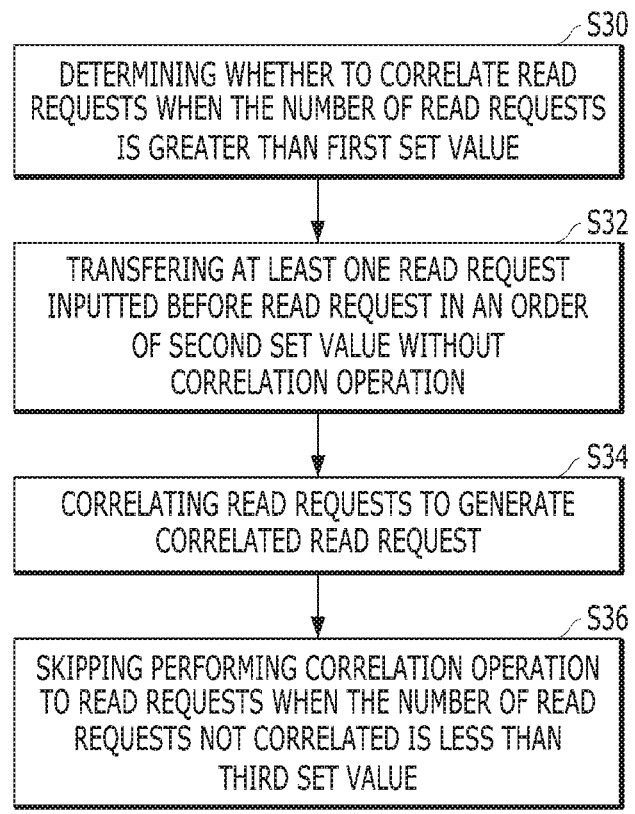
FIG. 7 illustrates a process for correlating plural read requests in a controller according to an embodiment of the disclosure.

FIG. 7 illustrates a correlation operation method of a controller according to an embodiment of the disclosure. According to an embodiment, the correlation operation may be performed by the correlation circuitry 194 in the controller 130 (see FIGS. 1 and 6).

Referring to FIG. 7, the method of performing the correlation operation may include determining whether to correlate read requests when the number of read requests is greater than a first set value (S30), transferring at least one read request inputted before the read request in an order of a second set value without the correlation operation S32 correlating the read requests to generate correlated read request (S34), and skipping performing the correlation operation to the read requests when the number of uncorrelated read requests is less than a third set value (S36).

In some embodiments, the first set value, the second set value, and the third set value may be determined based on the numbers of memory dies and channels in the memory system 110. In addition, the first set value, the second set value, and the third set value may be determined based on the characteristics of the correlation operation described with the graphs of FIG. 5A and FIG. 53. For example, the first set value may be the first reference value REF1, the second set value may be the third reference value REF3, and the third set value may be the fourth reference value REF4. Also, the first set value, the second set value, and the third set value may be adjusted based on a success rate of the correlation operation, which may be accumulatively monitored and tracked. These set values may be considered thresholds.

As shown FIG. 5(*a*), even when a plurality of read requests are received for the correlation operation, the probability of correlation may be low when the number of read requests is a few. For example, when the number of channels in the memory system 110 is two and the correlation operation is performed for three read requests, it is possible that two read requests may be correlated but one read request may not be correlated. In addition, when an unsuccessful attempt is made to correlate all three read requests, the data input/output performance of the memory system 110 may be degraded because of the time consumed by the attempted correlation operation. To solve this issue, according to an embodiment, a process for performing the correlation operation may include determining whether to attempt the correlation operation in response to the number of read requests transmitted for the correlation operation (S30). The first set value may be determined based on the number of channels. For example, the first set value may be less than or equal to the number of channels.

In addition, even if the number of read requests transferred is greater than the first set value and the controller 130 decides to perform the correlation operation, the data input/output performance of the memory system 110 may be degraded when the operation control circuitry 196 of FIGS. 1 and 6 is in an idle state. Therefore, even if a plurality of read requests are transmitted, a read request having a transmitted order number lower than the second set value may be transferred to the operation control circuitry 196 without the correlation operation (S32). For example, it is assumed that the correlation operation would be performed for 20 read requests. If the operation control circuitry 196 is in the idle state, the correlation circuitry 194 may transfer the first or the second read request among the 20 read requests into the operation control circuitry 196 without performing the correlation operation. That is, the correlation circuitry 194 does not attempt to correlate the first or the second read request. According to an embodiment, the second set value may be equal to or less than the number of channels in the memory system 110.

The controller 130 may perform the correlation operation with respect to the transferred read request (S34). For example, the correlation circuitry 194 receives the 20 read requests, and transfers the first and the second read requests to the operation control circuitry 196 without performing the correlation operation. While the correlation circuitry 194 performs the correlation operation to the remaining 18 read requests, the operation control circuitry 196 may perform address translations for the first or second read requests and transfer the first and the second read requests to one or two memory dies among the plurality of memory dies in the memory device 150. While the operation control circuitry 196 handles the first and second read requests, the correlation circuitry 194 may have an operation margin for performing the correlation operation to at least some of the remaining 18 read requests.

The controller 130 may not perform the correlation operation when the number of uncorrelated read requests is less than the third set value (S36). In other words, the controller 130 may skip the correlation operation in that case. For example, it is assumed that three read requests are still uncorrelated in the process of performing the correlation operation on the 18 read requests. When the correlation circuitry 194 holds three uncorrelated read requests to correlate with another read request inputted later, the operation control circuitry 196 may be in an idle state. In this case, the data input/output performance of the memory system 110 may be degraded. When the number of uncorrelated read requests is less than the third set value, the correlation circuitry 194 may stop the correlation operation on the remaining uncorrelated read requests. According to an embodiment, the third set value may be greater than the number of channels in the memory system 110 and/or less than or equal to the number of memory dies.

The controller 130 may store a correlation rate resulted by the correlation operation (for example, a ratio of correlated read requests to total transferred read requests). For example, the correlation rate may be obtained from dividing the number of correlated read requests by the number of read requests delivered for correlation. The controller 130 may calculate the correlation rate and store the correlation rate in the memory 144 in FIG. 2. As shown in FIG. 5(a), the correlation rate may be estimated based on the number of read requests transmitted for the correlation operation. According to an embodiment, the controller 130 may stop the correlation operation when the correlation rate reaches a set value based on the number of read requests for the correlation operation. In this case, even though the controller 130 may perform the correlation operation to deliver a correlated read request, overhead caused by the correlation operation may affect the data input/output performance of the memory system 110.

Figure 8:
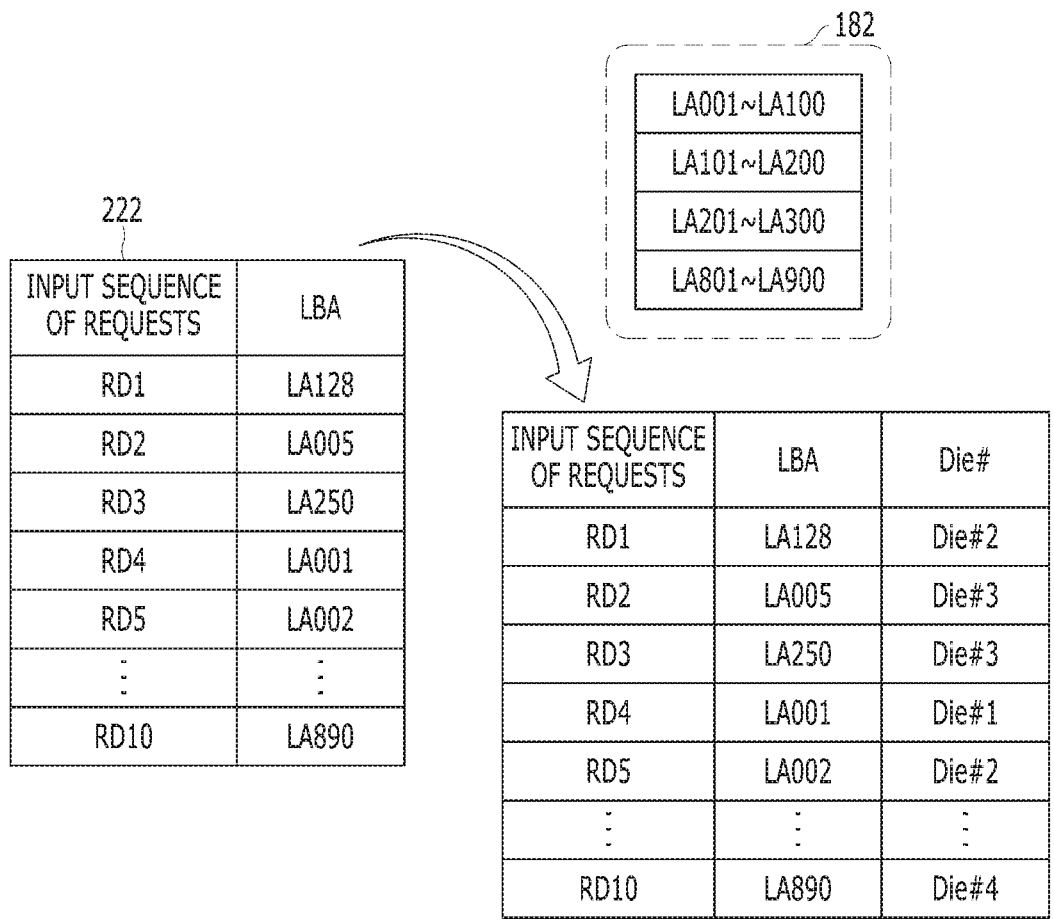
FIG. 8 illustrates a first method for controlling an operation in a memory system according to an embodiment of the disclosure.

FIG. 8 illustrates a first operation of the controller 130 regarding a plurality of read requests. For example, the first operation may be performed by the correlation circuitry 194 in FIG. 6.

Referring to FIG. 8, it is assumed that a plurality of read requests 222 from the host 102, which is an external device, are stored in the input buffer 184 (see FIG. 6). The plurality of read requests 222 stored in the input buffer 184 may be sorted according to the order in which they are received from the host 102. In the illustrated embodiment, the plurality of read requests 222 includes ten read requests RD1 to RD10.

Before the 10 read requests RD1 to RD10 are correlated, plural segments of map information about some logical addresses LA001 to LA100, LA101 to LA200, LA201 to LA300, LA801 to LA900 are loaded in the map memory 182. When a segment of map information required for performing address translation for logical addresses (LBA) received with 10 read requests RD1 to RD10 is not loaded in the map memory 182, the controller 130 may receive corresponding map information from the memory device 150 and store the map information in the map memory 182.

The read requests RD1 to RD10 may have the same structure such as the same code according to a protocol between the host 120 and the memory system 110. By way of example, in FIG. 8, the read requests RD1 to RD10 are received in that order. Each read request RD1 to RD10 may be transferred together with at least one logical address LBA used by the host 102.

Referring to the map memory 182, the correlation circuitry 194 in the controller 130 may recognize which memory die each read request inputted with the logical address LBA is transmitted into.

When the correlation circuitry 194 checks a memory die in the memory device 150 based on the logical address (LBA) corresponding to each read request, the correlation circuitry 194 may recognize which channel each read request is transferred via, as described in FIG. 8. However, the correlation circuitry 194 does not determine which memory die the first read request RD1 should be delivered to, when the operation control circuitry 196 is in an idle state as described with reference to FIG. 7.

Figure 9:
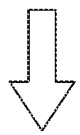
FIG. 9 illustrates a second method for controlling an operation in a memory system according to an embodiment of the disclosure.
Figure 9:
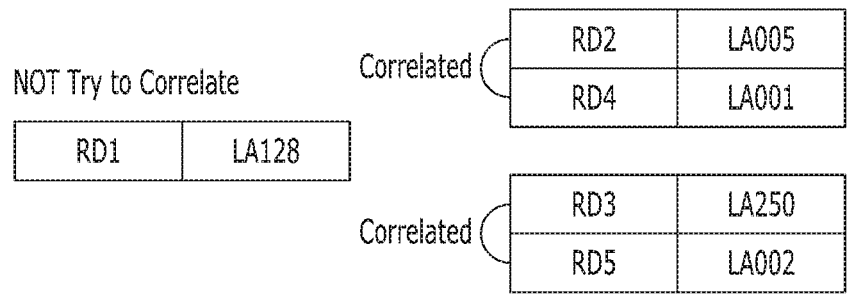

FIG. 9 illustrates a second operation of the controller 130 regarding a plurality of read requests. For example, the second operation may be performed by the correlation circuitry 194 in the controller 130.

Referring to FIG. 9, the correlation circuitry 194 may pass the first read request RD1 to the operation control circuitry 196 without attempting the correlation operation. The correlation circuitry 194 may perform the correlation operation on the second read request RD2 to the last read request RD10.

Based on the logical address (LBA) received along with each read request from the second read request (RD2) to the last read request (RD10), the correlation circuitry 194 may recognize which memory die is a physical location in data corresponding to the logical address is stored and which channel the data is transmitted via. Then, the correlation circuitry 194 may correlate 9 read requests RD2 to RD10 based on the number of channels, sequentially. Referring to FIGS. 6 and 9, the second read request RD2 may be correlated with the fourth read request RD4, because the second read request RD2 and the fourth read request RD4 are transmitted via different channels. The second read request RD2 and the third read request RD3 are not correlated, because the second read request RD2 and the third read request RD3 are transmitted via the same channel. The third read request RD3 may be correlated with the fifth read request RD5.

The correlation circuitry 194 may sequentially correlate read requests according to an input order or an input sequence. In FIG. 9, the correlation circuitry 194 does not attempt the correlation operation with respect to the first read request RD1. Alternatively, when the operation control circuitry is busy, the correlation circuitry 194 may also perform the correlation operation with respect to the first read request RD1. When the correlation circuitry 194 performs the correlation operation from the first read request RD1, the first read request RD1 and the second read request RD2 may be correlated because the first read request RD1 and the second read request RD2 are transmitted via different channels. Then, the third read request RD3 may be correlated with the fourth read request RD4. According to an embodiment, a result of the correlation operation performed by the correlation circuitry 194 may be different.

Figure 10:
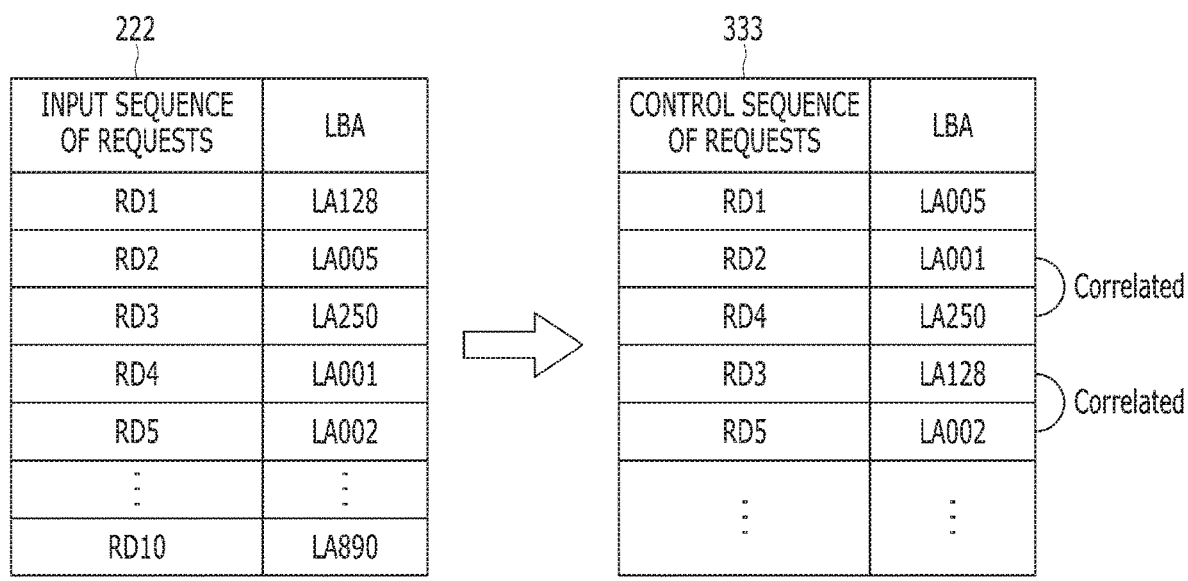
FIG. 10 illustrates a result of correlation process performed by a controller according to an embodiment of the disclosure.

FIG. 10 illustrates a result of the correlation operation performed by the controller 130.

Referring to FIG. 10, the plurality of read requests 222 received from the host 102 may include the ten read requests RD1 to RD10. The plurality of read requests 222 may be arranged according to the order in which they are delivered to the memory system 110 or the controller 130.

After the processes shown in FIGS. 8 and 9, the plurality of correlated read requests 333, which are correlated by the controller 130, are arranged in an order of execution. The first read request RD1 is transmitted without the correlation operation. The second read request RD2 and the fourth read request RD4 are correlated and transferred as correlated read requests, and the third read request RD3 and the fifth read request RD5 are correlated and transferred as correlated read requests. According to a transferred order, the operation control circuitry 196 may determine an execution order. If another read request is not correlated with another read request, the uncorrelated read request may be transferred later then the correlated read request, so that the uncorrelated read request may be performed after the correlated read request is performed. Here, the execution order may indicate an order in which the operation control circuitry 196 in FIG. 5 handles or processes a plurality of read requests.

As described above, a plurality of read requests received in the memory system 110 may be correlated corresponding to the number of channels in the memory system 110, and then each read request may be individually executed. Even if the memory system 110 does not have the address limitation structure having a strict rule about a physical location for storing a piece of data for interleaving operation, the controller 130 in the memory system 110 may perform the correlation operation on the plurality of read requests and then perform operations corresponding to the plurality of read requests according to a rescheduled order or an adjusted order based on a result of the correlation operation. Accordingly, plural pieces of data between the memory device 150 and the controller 130 may be transmitted in an interleaving way or according to an interleaving scheme through the plurality of channels.

Although the correlation operation is performed on some of the plurality of read requests, the data input/output performance of the memory system 110 may be improved compared to when interleaving data transmission does not occur for all the plurality of read requests. In addition, in order that the correlation operation does not degrade the data input/output performance of the memory system 110, the correlation operation may be performed to read requests when there are plural pieces of data to be outputted to the host 102 in the output buffer 186. For example, when 30 read requests are received in a situation where there is no piece of data in the output buffer 186, the memory device 110 may skip correlating three read requests among 30 read requests and make the operation control circuitry 196 execute operations corresponding to the three read request in accordance with an input order without the correlation operation. While the operation control circuitry 196 executes three read requests to output read data to the host 102, the correlation circuitry 194 in the controller 130 may attempt to correlate 27 other read requests.

It is assumed that three read requests are not correlated with each other in the process of attempting the correlation operation for the 27 read requests. The correlation circuitry 194 may stop attempting the correlation operation with respect to the three remaining read requests, because the probability of correlation may be low when that few read requests remain. When the correlation circuitry 194 unnecessarily uses resources to attempt to correlate a few read requests, the correlation circuitry 194 may affect the data input/output performance of the memory system 110.

As described above, according to an operation environment of the memory system 110, the controller 130 may control whether to attempt to correlate a plurality of read requests. For example, the controller 130 may determine whether to perform the correlation operation on the first of the plurality of read requests according to a state of the output buffer 186. In addition, when a read request for the correlation operation is continuously received, the correlation operation may be continued for a previously inputted read request and a currently inputted read request. However, when there are no more read requests received, uncorrelated read requests might be passed to perform a corresponding operation according to the order in which such read requests were received, in order to avoid deteriorating the data input/output performance of the memory system 110. When the controller 130 holds uncorrelated read requests for correlation operation with other read requests, the data input/output performance of the memory system 110 might be degraded.

It may be difficult for the memory system 110 to predict the likelihood that a plurality of read requests will be correlated with each other because such likelihood changes. For example, the probability of the controller 130 performing a correlation operation increases as the number of read requests for the correlation operation is increases. Conversely, a lower number of received read requests means a lower probability of performing the correlation operation. Because plural pieces of data requested by the host 102 may be distributed even if the memory system 110 does not apply an address limitation to store the plural pieces of data, the probability that the controller 130 may correlate read requests varies as indicated above.

In an embodiment, the controller 130 may perform the correlation operation on a plurality of read requests for a random read operation and/or a sequential read operation which the host 102 requests from the memory system 110.

Figure 11:
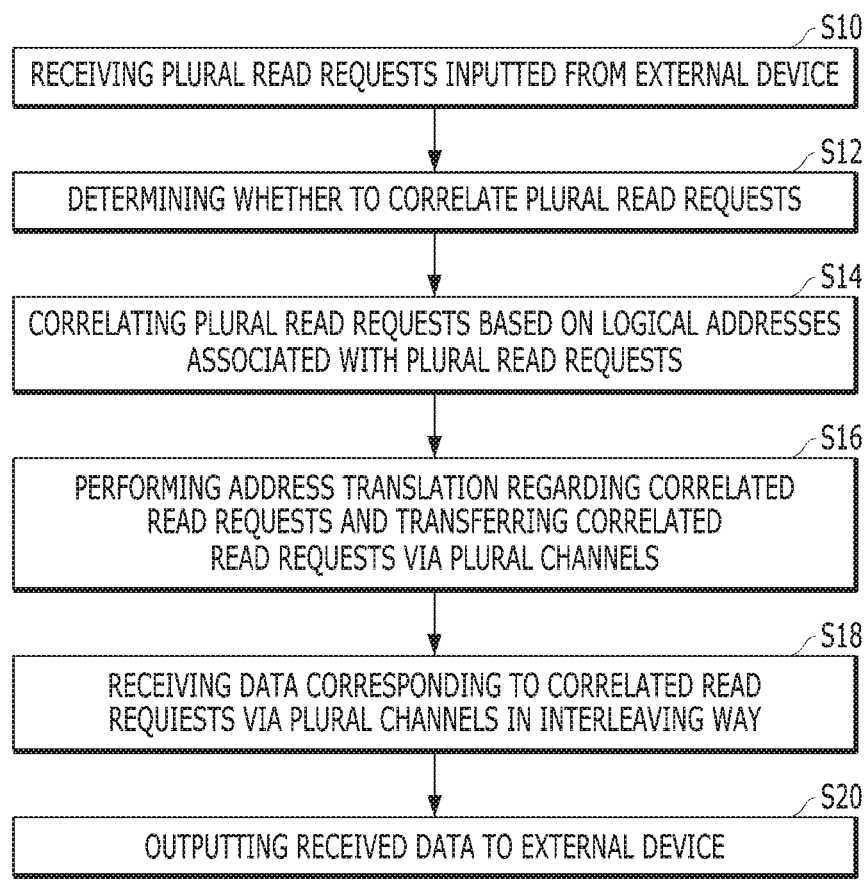
FIG. 11 illustrates a first method for operating a memory system according to an embodiment of the disclosure.

FIG. 11 illustrates a first example of a method for operating a memory system.

Referring to FIG. 11, the method for operating a memory system may include steps S12 to S20. The step S10 may include receiving a plurality of read requests from an external device or a host. The step S12 may include determining whether to correlate the plurality of read requests. The step S14 may include performing a correlation operation on the plurality of read requests based on logical addresses associated with the plurality of read requests. The step S16 may include performing address translation regarding correlated read requests to transfer the correlated read requests into specific memory dies among the plurality of memory dies through a plurality of channels. The step S18 may include receiving plural pieces of data corresponding to the correlated read requests in an interleaving way. The step S20 may include outputting the plural pieces of data to the external device, e.g., the host.

In some embodiments, the method for operating the memory system may further include performing the address translation regarding an uncorrelated read request sequentially to transfer the uncorrelated read request to a specific memory die among the plurality of memory dies, and receiving a piece of data corresponding to the uncorrelated read request from the specific memory die. By way of example but not limitation, the memory system may determine an execution order or sequence of the plurality of read requests according to whether they are correlated, not on the order in which the plurality of read requests were received. The memory system may perform operations corresponding to the correlated read requests first and, then, perform an operation corresponding to uncorrelated read request(s).

The step S12 may be carried out based on the number of read requests for the correlation operation, and an operation state of an output buffer. In order to perform the correlation operation under a condition where the data input/output performance of the memory system is not deteriorated, the correlation operation may be performed after an operation margin for the correlation operation is secured.

In some embodiments, the method for operating the memory system may further include determining whether the number of pieces of data to be outputted to the external device in the output buffer is more than a reference value. The reference value may be determined based on a first data input/output speed between the external device and/or the memory system and a second data input/output speed between the controller and the plurality of memory dies. For example, it is assumed that it takes 10 ms for the memory system to transmit a piece of data to the external device. If the output buffer includes 10 pieces of data to be outputted to the external device, the memory system may have an operating margin of 100 ms (=10×10). For example, it is assumed that it takes 5 ms to transfer a read request and receive a piece of data between the controller and the plurality of memory dies in the memory system. In this case, the controller may attempt to correlate a plurality of read requests during an operating margin secured up to 95 ms of the 100 ms.

The controller may recognize an operation speed (or a set operation margin) for an internal operation, check a time spent on the internal operation, and calculate an operation margin according to a protocol defining communication between the host and the memory system. Accordingly, the controller may calculate and estimate an operation margin for attempting to correlate the plurality of read requests. For example, the controller may calculate the maximum value of the operating margin secured for the correlation operation and perform the correlation operation to the plurality of read requests during a time corresponding to 70 to 90% of the maximum value. According to an embodiment, a time range during which the controller may attempt to correlate the plurality of read requests may be different. Further, the controller may dynamically determine an operation margin when the controller may attempt to correlate the plurality of read requests based on an operation environment of the memory system and an operating state of the memory device.

In the step S14, the correlation operation may be performed based on the logical addresses associated with the plurality of read requests, according to an input order or an input sequence of the plurality of read requests. The correlated read requests may be delivered earlier than the uncorrelated read request, so that the data input/output performance of the memory system 110 may be improved.

In some embodiments, to avoid deterioration of the data input/output performance of the memory system, sometimes the correlation operation may not be attempted to some of the plurality of read requests. For example, if circuitry performing address translation is in an idle state, the correlation operation may not be attempted on a small number of read requests, e.g., one or two read requests.

When map data associated with logical addresses inputted together with some read requests is not loaded in a cache memory (or a map data region in a volatile memory), the method may include requesting corresponding map data from the plurality of memory dies. If there is not enough space to store the map data in the cache memory, requested map data may be loaded after updated map data is programmed into the memory device and released. Alternatively, unnecessary map data may be released in the cache memory. For example, when the map data requested in the region cannot be stored in the cache memory, the map data used least recently in the cache memory may be released. According to an embodiment, when the requested map data cannot be stored in the cache memory, the map data least frequently used in the cache memory may be released.

In the step S16, the address translation may be performed on each read request according to an execution order changed by the correlation operation. The controller may translate logical addresses associated with the correlated read requests into physical locations where pieces of data associated with the logical addresses are stored, based on the map data and the map information loaded in the map memory 182. Further, the controller may transmit the correlated read requests into plural memory dies in the memory device 150 via different channels.

In the step S18, each of the memory dies may output a piece of data in response to the read request. Herein, the read requests, each transmitted to a respective memory die, may be transmitted sequentially via each channel and transmitted in parallel via different channels. Plural pieces of data outputted from the memory dies may be also transmitted sequentially via each channel and transmitted in parallel via different channels.

After receiving the plural pieces of data through a plurality of channels, the controller 130 may output the plural pieces of data to the external device or the host (S20). The controller 130 may temporarily store the plural pieces of data in the output buffer 186 before outputting the plural pieces of data to the external device. In the output buffer 186, plural pieces of data are outputted in an input order (e.g., FIFO) to the external device.

Figure 12:
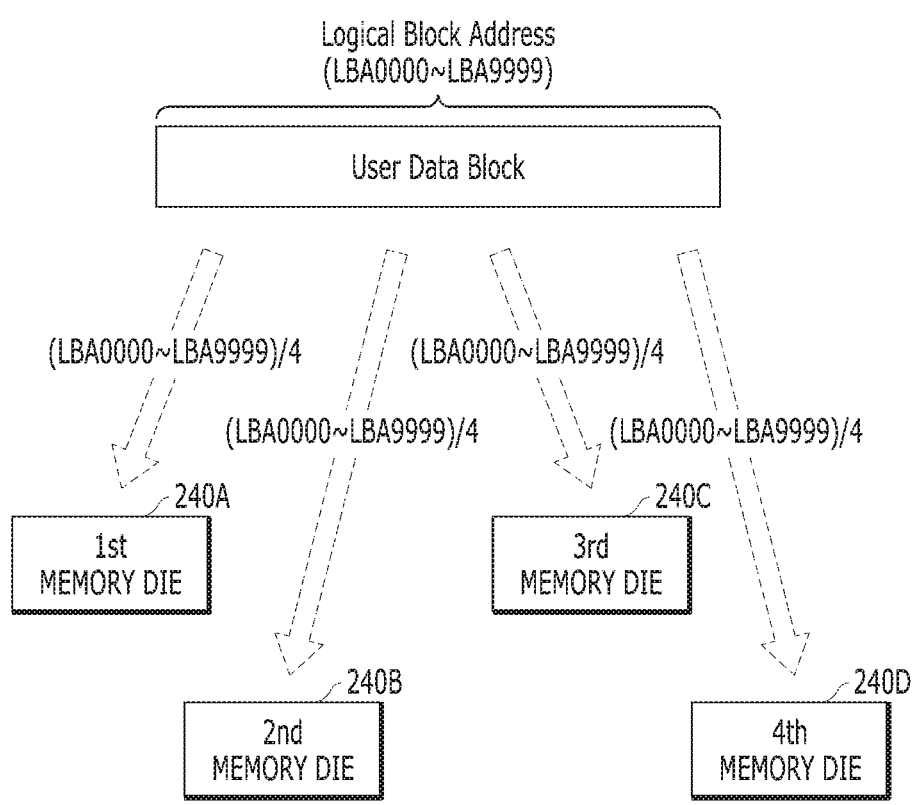
FIG. 12 illustrates an address allocation scheme according to an embodiment of the disclosure.

FIG. 12 illustrates an example of an address allocation scheme for improving the data input/output performance of the memory system.

Referring to FIG. 12, the memory system 110 may have an address allocation scheme for determining a physical location (or a physical address) within the memory device 150 with respect to a logical block address used by an external device (or a host). In FIG. 12, it is assumed that the host uses logical addresses from 'LBA0000' to 'LBA9999' and the memory device 150 includes four memory dies 240A, 240B, 240C, 240D.

The address allocation scheme (or an address assignment policy) may be adopted in the memory system 110. When a program request is inputted with a piece of data and a logical address, the memory system 110 may utilize the address allocation scheme to determine a physical location where the piece of data associated with the logical address is stored among a plurality of memory dies in the memory device 150. The address allocation scheme may distribute plural pieces of data over the plurality of memory dies evenly. The logical address may be associated with a specific memory die according to the number of memory dies in the memory device 150. When the range of logical addresses used by the host is from 'LBA0000' to 'LBA9999', the logical addresses may be divided into four groups.

A process for dividing the logical addresses into the four groups may vary. For example, plural pieces of data associated with logical addresses of 'LBA0000' to 'LBA2499' may be stored in the first memory die 240A. The second memory die 240B may be allocated for storing plural pieces of data associated with other logical addresses of 'LBA2500' to 'LBA4999.' In addition, data associated with logical addresses of 'LBA5000' to 'LBA7499' may be programmed to the third memory die 240C. The fourth memory die 240D may be allocated for storing a logical address range of 'LBA7500' to 'LBA9999.'

In another example, the memory system 110 may sequentially allocate one of the first memory die 240A through the fourth memory die D for each piece of data associated with the logical addresses 'LBA0000' to 'LBA9999.' For example, a piece of data associated with a logical address of 'LBA0001' may be stored in the first memory die 240A, and another piece of data associated with a next logical address of 'LBA0002' may be programmed in the second memory die 240B. The memory system 110 may allocate the third memory die 240C for storing a piece of data associated with a logical address of 'LBA0003.' Another piece of data associated with a logical address of 'LBA0004' may be programmed in the fourth memory die 240D. The memory system 110 may allocate the first memory die 240A for storing another piece of data associated with a logical address of 'LBA0005.'

The memory system 110 may divide the logical addresses used by the host by the number of memory dies, and evenly allocate them to each memory die. However, the address allocation scheme does not restrict a specific physical position (i.e., block or page) within each memory die. The specific physical position may be determined based on an operation environment, an operation state, and an internal configuration of each memory die. As a result, during the program operation, the memory system 110 may reflect an internal operating state in each memory die to determine a physical location in which data is to be stored, thereby providing efficient management regarding a usage and a lifespan of each memory die. In addition, because a plurality of channels might be equally used, it is likely that plural pieces of data in the memory system 110 are transmitted in an interleaving way, so that the data input/output performance of the memory system 110 may be improved.

In addition, when the memory system 110 adopts the address allocation scheme, the correlation operation performed by the correlation circuitry 194 may be simplified. This is because the correlation circuitry 194 does not need to use map data and map information for performing the correlation operation.

Figure 13:
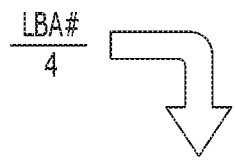
FIG. 13 illustrates a correlation operation based on an address allocation scheme according to an embodiment of the disclosure.

FIG. 13 illustrates the correlation process in a memory system having the address allocation scheme.

Referring to FIG. 13, the address allocation scheme or the address assignment policy adopted by the memory system 110 (see FIGS. 1 to 3) may allocate physical locations for plural pieces of data associated with logical addresses of 'LBA0000' to 'LBA9999.' In this case, it is assumed that a plurality of memory dies (e.g., 4 memory dies) may be sequentially allocated for storing the plural pieces of data associated with logical addresses of 'LBA0000' to 'LBA9999.'

For example, a piece of data corresponding to a logical address of 'LBA0000' may be programmed in the fourth memory die 240D (#4), another piece of data associated with a logical address of 'LBA0001' may be stored in the first memory die 240A (#1), and another piece of data associated with a logical address of 'LBA0002' may be stored in the second memory die 240B (#2). The third memory die 240C (#3) may be allocated for programming a piece of data associated with a logical address of 'LBA0003,' the fourth memory die 240D (#4) may store another piece of data associated with a logical address of 'LBA0004,' and the first memory die 240A (#1) may be allocated for programming a piece of data associated with a logical address of 'LBA0005.'

In the memory system 110 employing the above-described address allocation scheme, the controller may correlate a plurality of read requests based on a plurality of logical addresses. When the correlation operation is performed on the plurality of read requests, the controller may divide the plurality of logical addresses by the number of memory dies (e.g., 4). The plurality of read requests may be correlated with each other based on the remainder of dividing each logical address by the number of memory dies (e.g., 4).

For example, if a first logical address is divided by 4 so that the remainder is 0, it is presumed that a piece of data corresponding to the logical address is programmed in the fourth memory die 240D coupled with the controller via a second channel. Accordingly, the first read request may be correlated with another read request inputted with another logical address which indicates a piece of data programmed in the first memory die or the second memory die coupled with the controller via a first channel which is distinguishable from the second channel (i.e., its remainder is '1' or '2'). In addition, when a logical address inputted with a read request is divided by 4 so that the remainder is 1, a piece of data associated with the logical address is programmed in the first memory die 240A coupled with the controller via the first channel. The read request may be correlated with another read request for reading a piece of data stored in the third memory die 240C or the fourth memory die 240D (the remainder is '0' or '3').

In addition, when a logical address inputted together with another read request is divided by 4 so that the remainder is 2, a piece of data associated with the logical address may be stored in the second memory die 240B coupled with the controller via the first channel. The read request may be correlated with another request inputted with a logical address indicating a piece of data stored in the third memory die 240C or the fourth memory die 240D coupled with the controller via the second channel (the remainder is '0' or '3'). In addition, when a logical address inputted with another read request is divided by 4 so that the remainder is 3, the read request may be transferred into the third memory die 240C coupled with the controller via the second channel. The read request may be correlated with another read request inputted together with a logical address indicating a piece of data stored in the first memory die 240A or the second memory die 240B coupled with the controller via the first channel (the remainder is '1' or '2').

Figure 14:
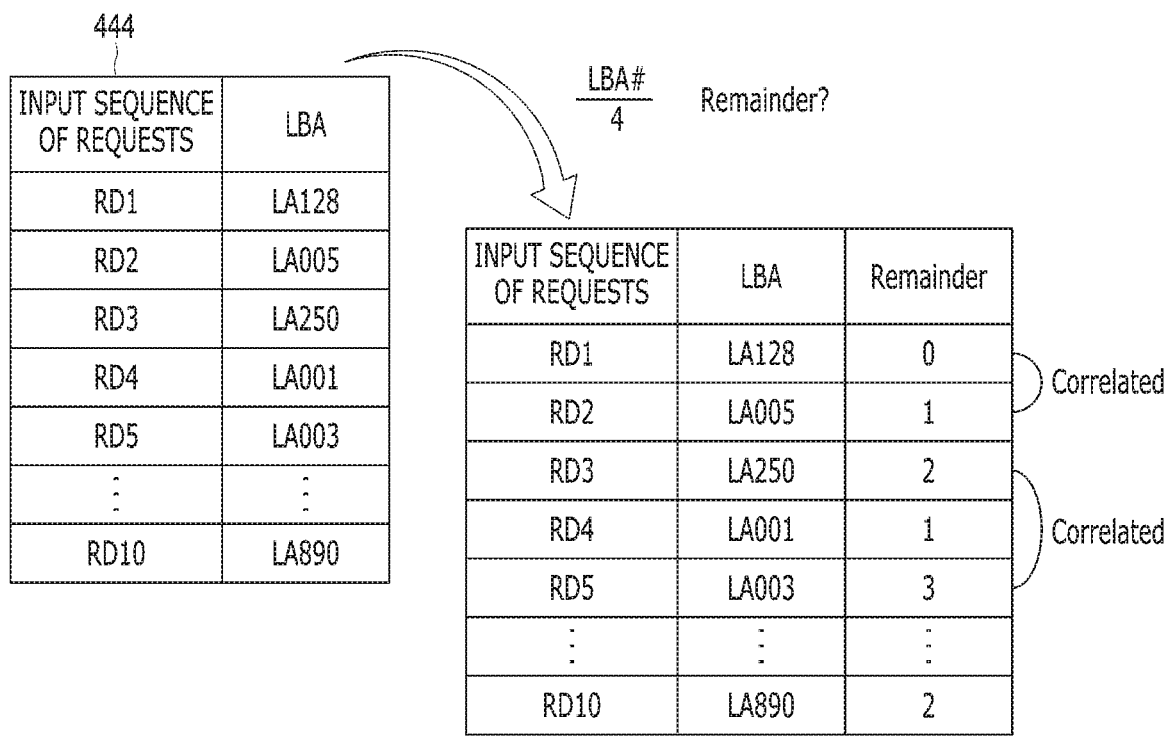
FIG. 14 illustrates a process for correlating plural read requests in a controller according to an embodiment of the disclosure.

FIG. 14 illustrates how to perform a correlation operation to a plurality of read requests in a memory system adopting an improved address allocation scheme.

Referring to FIG. 14, it is assumed that a plurality of read requests RD1 to RD10 are inputted from the external device (or the host) and four memory dies are included in the memory system 110. Each of the plurality of read requests RD1 to RD10 may be delivered with a logical address. Based on the logical address associated with each of the plurality of read requests RD1 to RD10, the memory system 110 may correlate the plurality of read requests RD1 to RD10 with each other for data transmission in an interleaving way.

When a logical address associated with the first read request RD1 is 'LA128', the logical address is divided by 4 so that the remainder is '0.' The logical address 'LA128' may indicate a piece of data stored in the fourth memory die 240D. The controller may transmit the first read request RD1 to the fourth memory die 240D via the second channel. The memory system 110 may recognize that the piece of data may be transferred through the second channel. Since a logical address associated with the second read request RD2 is 'LA005,' the logical address is divided by 4 so that the remainder is '1.' The second read request RD2 with the logical address 'LA005' may be transmitted to the first memory die 240A coupled with the controller via the first channel. Therefore, the memory system 110 may correlate the first read request RD1 and the second read request RD2.

When a logical address associated with the third read request RD3 is 'LA250,' the logical address is divided by 4 so that the remainder is '2.' The third read request RD3 may be transferred to the second memory die 240B based on the logical address 'LA250.' The memory system 110 may recognize that a piece of data corresponding to the third read request RD3 may be delivered over the first channel. When a logical address associated with the fourth read request RD4 the logical address is divided by 4, and the remainder is '1.' The fourth read request RD4 with the logical address 'LA001' may be transferred to the first memory die 240A. The memory system 110 may recognize that a piece of the data may be delivered through the first channel. Therefore, the memory system 110 does not correlate the third read request RD3 and the fourth read request RD4.

When the logical address associated with the fifth read request RD5 is 'LA003', the logical address is divided by 4, and the remainder is '3.' The logical address 'LA003' may be transferred to the third memory die 240C. The memory system 110 may recognize that a piece of data may be delivered over the second channel. Thus, the memory system 110 may correlate the fifth read request RD5 with the third read request RD3 which has received earlier among the uncorrelated read requests.

The memory system 110 may perform operations corresponding to the correlated read requests among the plurality of read requests RD1 to RD10 first. Then, the memory system 110 may perform an operation corresponding to an uncorrelated read request based on an input order or an input sequence.

Figure 15:
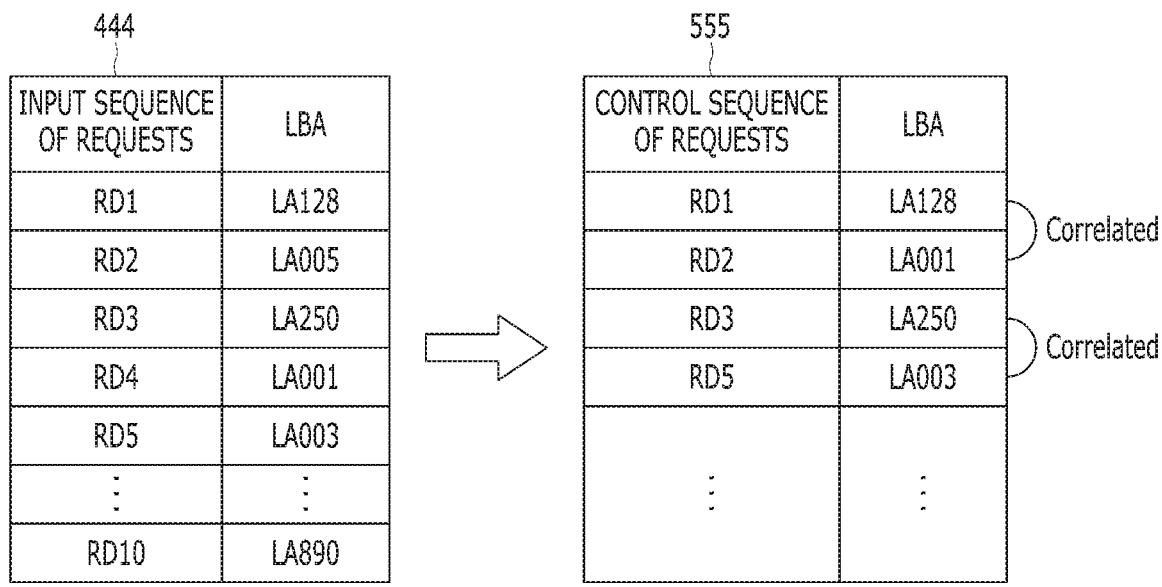
FIG. 15 illustrates a result of a correlation process according to an embodiment of the disclosure.

FIG. 15 illustrates a result of the correlation operation. In detail, FIG. 15 illustrates a first table 444 regarding a plurality of read requests RD1 to RD10 sorted by an input order or an input sequence, and a second table 555 indicating an execution order changed according to the result of the correlation operation with respect to the plurality of read requests RD1 to RD10. For example, the correlation operation may be performed in a way described with reference to FIG. 14.

The first read request RD1 and the second read request RD2 may be correlated, and the third read request RD3 and the fifth read request RD5 may be correlated. The correlated read requests are earlier received before other read requests, i.e., uncorrelated read requests. In addition, if there are other correlated read requests, operations corresponding to the correlated read requests may be performed before an operation corresponding to another uncorrelated read request is performed. Although not shown, the operation corresponding to the uncorrelated read request may be performed after the operations corresponding to the correlated read requests are performed.

Figure 16:
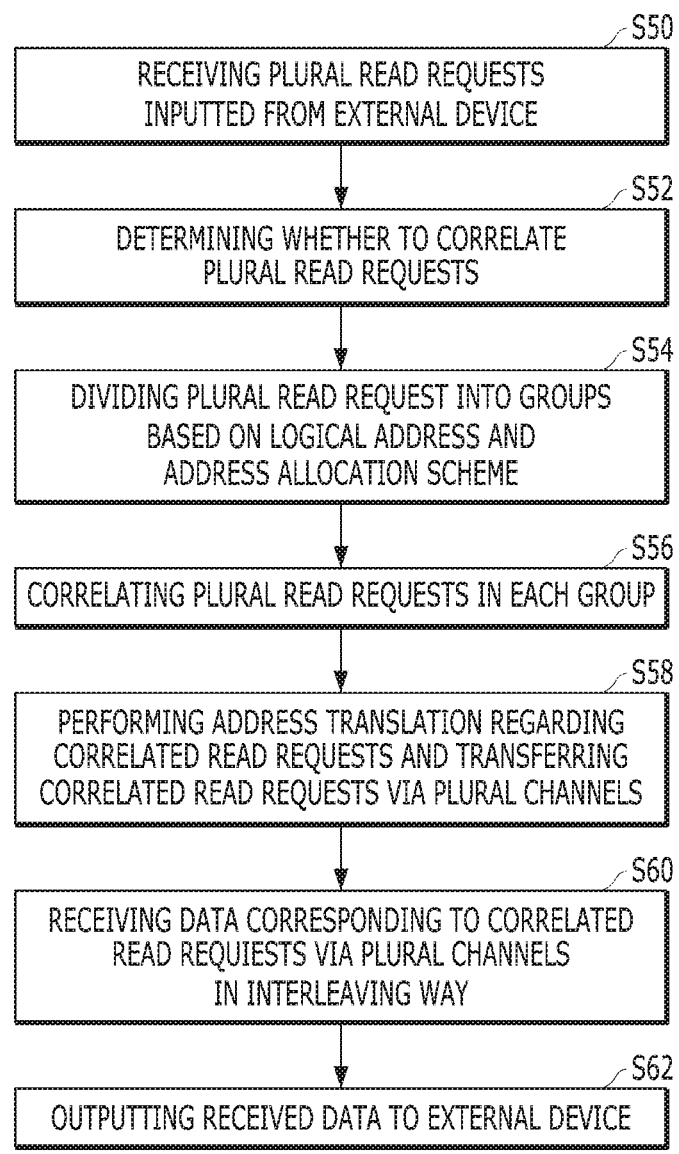
FIG. 16 illustrates a method for operating a memory system according to an embodiment of the disclosure.

FIG. 16 illustrates another example of the method for operating a memory system.

Referring to FIG. 16, the method for operating a memory system may include steps S50 to S62. The step S50 may include receiving a plurality of read requests from an external device (or a host). The step S52 may include determining whether to correlate the plurality of read requests. The step S54 may include dividing (or grouping or classifying) the plurality of read requests according to a correlation rule based on logical addresses associated with the plurality of read requests. The step S56 may include performing the correlation operation on classified read requests. The step S58 may include performing address translation regarding correlated read requests to transfer the correlated read requests into a plurality of memory dies via a plurality of channels. The step S60 may include receiving plural pieces of data, each corresponding to each the correlated read requests, in an interleaving way through the plurality of channels. The step S62 may include outputting the plural pieces of data to the external device.

When the plurality of read requests are received, the controller 130 in the memory system 110 (refer to FIGS. 1 to 3) may determine whether to perform a correlating operation on the plurality of read requests (S52). To reduce a side effect of the correlation operation in terms of the I/O throughput of the memory system 110, the memory system 110 may determine whether to perform the correlation operation based on a state of the output buffer and a possibility of correlation according to the number of the plurality of read requests. In addition, if there is no data transfer between the memory device 150 and the controller 130, the correlation operation may not be attempted for some read requests (e.g., the first read request) among the plurality of read requests.

When the memory system 110 adopts the address allocation scheme, the memory system 110 may perform the correlation operation without referring to map information or map data used for address translation. Referring to FIGS. 13 to 15, the plurality of read requests may be sequentially correlated based on logical addresses associated with the plurality of read requests and the number of memory dies in the memory device 150. The plurality of read requests may be classified based on the logical addresses according to the correlation rule that may be determined according to the address allocation scheme (S54). Thereafter, the correlation operation for the classified read requests may be performed (S56).

In the step S58, address translation may be performed on each logical address associated with each read request according to an execution order changed by the correlation operation. The logical addresses associated with the correlated read requests are translated into physical locations where plural pieces of data are stored, based on the map data loaded in the map memory 182 and the map information, so that the correlated read requests are transmitted to the memory device 150 in FIGS. 1 to 4.

In the step S60, the corresponding memory die may output each of the plural pieces of data in response to each of the correlated read requests individually transmitted to each memory die. Each memory die may output each piece of data in response to each read request sent to each memory die via each channel. Herein, the read requests each transmitted to each memory die may be transmitted sequentially via each channel and transmitted in parallel via different channels. Plural pieces of data outputted from the memory dies may be also transmitted sequentially via each channel and transmitted in parallel via different channels.

After receiving plural pieces of data through a plurality of channels, the controller 130 may output the plural pieces of data to the external device (S62). The controller 130 may temporarily store the plural pieces of data in the output buffer 186, and the output buffer 186 may output the plural pieces of data to the external device in a stored order such as FIFO.

As described above, the correlation operation correlates some read requests to be transmitted in parallel to different memory dies via different channels so that plural pieces of data outputted from the different memory dies are transmitted in parallel via the different channels. This may be referred to as a channel interleaving scheme. According to another embodiment, the correlation operation may be applied to correlate some read requests to be alternatively transmitted to different memory dies via the same channel so that plural pieces of data outputted from the different memory dies are transmitted alternatively via the same channel. This may be referred to as a way interleaving scheme.

According to an embodiment of the disclosure, a memory system, a data processing system, a method of operating the same, and a method of supporting an operation may avoid an address limitation regarding a physical location in the memory system, which is allocated for storing data, for interleaving operation. Thus, the memory system may reduce overhead in the memory system for an interleaving operation.

In addition, an embodiment of the disclosure may improve data input/output performance through an interleaving operation in a memory system, and reduce the address limitation regarding an physical location in the memory system for the interleaving operation, so that operational efficiency and lifespan of the memory device may be improved.

While the present invention has been illustrated and described with respect to the specific embodiments, it will be apparent to those skilled in the art in light of the present disclosure that various changes and modifications may be made without departing from the spirit and scope of the invention as defined in the following claims. The invention encompasses all changes and modifications that fall within the scope of the claims.

What is claimed is:

1. A memory system, comprising:
   a plurality of memory dies; and
   a controller coupled with the plurality of memory dies via a plurality of channels and configured to perform a correlation operation on at least some read requests among a plurality of read requests inputted from an external device so that the plurality of memory dies output plural pieces of data corresponding to the plurality of read requests via the plurality of channels in an interleaving way,
   wherein the controller is configured to determine when to perform the correlation operation based on a number of the plurality of read requests.

2. The memory system according to claim 1, wherein the controller is configured to perform the correlation operation when a number of pieces of data stored in an output buffer before being outputted to the external device, is greater than a threshold.

3. The memory system according to claim 2, wherein the output buffer includes a queue capable of outputting stored data according to an input sequence of the stored data, and
   the controller is configured to determine the threshold based on a first data input/output speed between the external device and the memory system and a second data input/output speed between the controller and the plurality of memory dies.

4. The memory system according to claim 1, wherein the controller is configured to skip the correlation operation when the number of the plurality of read requests is less than a number of the plurality of memory dies.

5. The memory system according to claim 4, wherein the controller is configured to stop the correlation operation on remaining read requests not yet correlated when a number of remaining read requests is less than the number of the plurality of memory dies.

6. The memory system according to claim 1, wherein the controller is configured to skip the correlation operation on a first read request to a (n−1)th read request among the plurality of read requests, and perform the correlation operation on an n-th read request to a last read request among the plurality of read requests, and
   wherein n is a number of the plurality of channels.

7. The memory system according to claim 1, wherein the controller is configured to allocate a physical location in the plurality of memory dies for programming each piece of data, regardless of a logical address associated with the piece of data, and
   the controller is configured to perform the correlation operation based on map data.

8. The memory system according to claim 1, wherein the controller is configured to allocate a physical location in the plurality of memory dies, based on a number of the plurality of memory dies and a logical address associated with each piece of data, and the controller is configured to perform the correlation operation based on logical addresses corresponding to the plurality of read requests.

9. The memory system according to claim 1, further comprising:
   a memory for storing map data;
   an input buffer for storing the plurality of read requests; and
   an output buffer for storing plural pieces of data outputted to the external device.

10. The memory system according to claim 9, wherein the controller includes:
    buffer control circuitry configured to monitor states of the input buffer and the output buffer to determine whether to perform the correlation operation;
    correlation circuitry configured to proceed, stop or skip the correlation operation on the plurality of read requests based on a number of the plurality of read requests received, and to transfer a correlated read request earlier than an uncorrelated read request among the plurality of read requests; and
    operation control circuitry configured to perform an address translation on the plurality of read requests according to a transferred sequence of the plurality of read requests, and to transfer the plurality of read requests to the plurality of memory dies via the plurality of channels.

11. The memory system according to claim 10, wherein the controller is configured to store a correlation rate of the correlation operation, and to determine at least one threshold used as a reference for determining whether to proceed, stop or skip the correlation based on the correlation rate, a number of the plurality of channels and a number of the plurality of memory dies.

12. A method for operating a memory system, comprising:
    receiving a plurality of read requests inputted from an external device;
    determining when to perform a correlation operation on the plurality of read requests based on a number of the plurality of read requests received;
    performing the correlation operation on some read requests among the plurality of read requests based on a determination result;
    performing an address translation for a correlated read request to transfer the correlated read request to a plurality of memory dies via a plurality of channels;
    receiving data corresponding to the correlated read request from the plurality of memory dies via the plurality of channels in an interleaving way; and
    outputting the data to the external device.

13. The method according to claim 12, further comprising:
    performing an address translation for an uncorrelated read request to transfer the uncorrelated read request to a plurality of memory dies via a plurality of channels; and
    receiving other data corresponding to the uncorrelated read request from the plurality of memory dies to output the other data to the external device.

14. The method according to claim 12, wherein the determining when to perform the correlation operation includes:
    determining when a number of pieces of data stored in an output buffer before being outputted to the external device, is greater than a threshold, and
    wherein the threshold is determined based on a first data input/output speed between the external device and the memory system and a second data input/output speed between a controller and the plurality of memory dies.

15. The method according to claim 12, wherein the performing the correlation operation includes:
skipping the correlation operation when the number of the plurality of read requests received is less than a number of the plurality of memory dies.

16. The method according to claim 12, wherein the performing the correlation operation includes:
skipping the correlation operation on a first read request to a (n−1)th read request among the plurality of read requests; and
performing the correlation operation on n-th read request to a last read request among the plurality of read requests,
wherein n is a number of the plurality of channels.

17. The method according to claim 16, wherein the performing the correlation operation further includes:
stopping the correlation operation on remaining read requests not yet correlated when a number of remaining read requests is less than a number of the plurality of memory dies.

18. The method according to claim 12, further comprising:
allocating a physical location in the plurality of memory dies for programming each piece of data, regardless of a logical address associated with the piece of data,
wherein the correlation operation is performed based on map data.

19. The method according to claim 12, further comprising:
allocating a physical location in the plurality of memory dies, based on a number of the plurality of dies and a logical address associated with each piece of data,
wherein the correlation operation is performed based on logical addresses corresponding to the plurality of read requests.

20. The method according to claim 12, wherein the performing the correlation operation includes:
proceeding, stopping or skipping the correlation operation to the plurality of read requests based on the number of the plurality of read requests;
transferring a correlated read request earlier than an uncorrelated read request among the plurality of read requests; and
storing a correlation rate of the correlation operation to determine at least one threshold used as a reference for determining whether to proceed, stop or skip the correlation based on the correlation rate, a number of the plurality of channels and a number of the plurality of memory dies.

* * * * *